(12) United States Patent
Ong et al.

(10) Patent No.: US 12,736,799 B2
(45) Date of Patent: Sep. 15, 2026

(54) COVER ARCHITECTURES IN CURVED EYEPIECE STACKS FOR MIXED REALITY APPLICATIONS

(71) Applicant: Magic Leap, Inc., Plantation, FL (US)

(72) Inventors: Ryan Jason Ong, Austin, TX (US); Ling Li, Cedar Park, TX (US); Chieh Chang, Cedar Park, TX (US); Sharad D. Bhagat, Austin, TX (US); Christophe Peroz, San Francisco, CA (US); Victor Kai Liu, Mountain View, CA (US); Samarth Bhargava, Los Altos, CA (US); Mauro Melli, San Leandro, CA (US); Melanie Maputol West, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 229 days.

(21) Appl. No.: 18/554,623

(22) PCT Filed: Apr. 15, 2022

(86) PCT No.: PCT/US2022/071744
§ 371 (c)(1),
(2) Date: Oct. 9, 2023

(87) PCT Pub. No.: WO2022/221875
PCT Pub. Date: Oct. 20, 2022

(65) Prior Publication Data

US 2024/0192481 A1 Jun. 13, 2024

Related U.S. Application Data

(60) Provisional application No. 63/176,102, filed on Apr. 16, 2021.

(51) Int. Cl.
*G02B 25/00* (2006.01)
*G02B 27/01* (2006.01)

(52) U.S. Cl.
CPC ....... *G02B 25/001* (2013.01); *G02B 27/0172* (2013.01); *G02B 2027/0178* (2013.01)

(58) Field of Classification Search
CPC .............. G02B 25/001; G02B 27/0172; G02B 2027/0178; G02B 1/11; G02B 27/0176
See application file for complete search history.

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
(Continued)

OTHER PUBLICATIONS

European Search Report dated Jan. 22, 2025, for EP Application No. 22789133.0, eleven pages.
(Continued)

*Primary Examiner* — Mariam Qureshi
(74) *Attorney, Agent, or Firm* — Zi Y. Wong; Via LLP

(57) ABSTRACT

Eyepieces and methods of fabricating the eyepieces are disclosed. In some embodiments, the eyepiece comprises a curved cover layer and a waveguide layer for propagating light. In some embodiments, the curved cover layer comprises an antireflective feature.

20 Claims, 20 Drawing Sheets

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-Zeev et al. |
| 9,323,325 | B2 | 4/2016 | Perez et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 2003/0030597 | A1 | 2/2003 | Geist |
| 2006/0023158 | A1 | 2/2006 | Howell et al. |
| 2011/0211056 | A1 | 9/2011 | Publicover et al. |
| 2011/0213664 | A1 | 9/2011 | Osterhout |
| 2011/0221658 | A1* | 9/2011 | Haddick ............... G06F 1/1673 345/8 |
| 2012/0021806 | A1 | 1/2012 | Maltz |
| 2013/0077147 | A1 | 3/2013 | Efimov |
| 2014/0195918 | A1 | 7/2014 | Friedlander |
| 2015/0168731 | A1 | 6/2015 | Robbins |
| 2016/0209654 | A1 | 7/2016 | Riccomini et al. |
| 2018/0217395 | A1 | 8/2018 | Lin et al. |
| 2019/0278086 | A1* | 9/2019 | Ofir ........................ G02B 6/122 |
| 2020/0012095 | A1* | 1/2020 | Edwin .................. G02B 27/017 |
| 2020/0192122 | A1 | 6/2020 | Dobschal |
| 2020/0233128 | A1 | 7/2020 | Bouchier et al. |
| 2022/0050286 | A1* | 2/2022 | Amirsolaimani .. G02B 26/0833 |

FOREIGN PATENT DOCUMENTS

| | | | |
|---|---|---|---|
| CA | 2388766 | A1 | 12/2003 |
| CN | 107272210 | A | 10/2017 |
| CN | 108351520 | A | 7/2018 |
| DE | 102016225016 | A1 | 12/2017 |
| EP | 2924491 | A1 | 9/2015 |
| JP | H08313703 | A | 11/1996 |
| JP | 2013142821 | A | 7/2013 |
| JP | 2015184560 | A | 10/2015 |
| JP | 2017514172 | A | 6/2017 |
| JP | 2019517018 | A | 6/2019 |
| WO | 2008014330 | A2 | 1/2008 |
| WO | 2019156839 | A1 | 8/2019 |
| WO | 2019226269 | A2 | 11/2019 |
| WO | 2020167427 | A1 | 8/2020 |

OTHER PUBLICATIONS

International Preliminary Report and Written Opinion mailed Oct. 26, 2023, for PCT Application No. PCT/US2022/071744, seven pages.

Jacob, R. "Eye Tracking in Advanced Interface Design", Virtual Environments and Advanced Interface Design, Oxford University Press, Inc. (Jun. 1995).

Rolland, J. et al., "High- resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

* cited by examiner 702
702
702
700A
700B

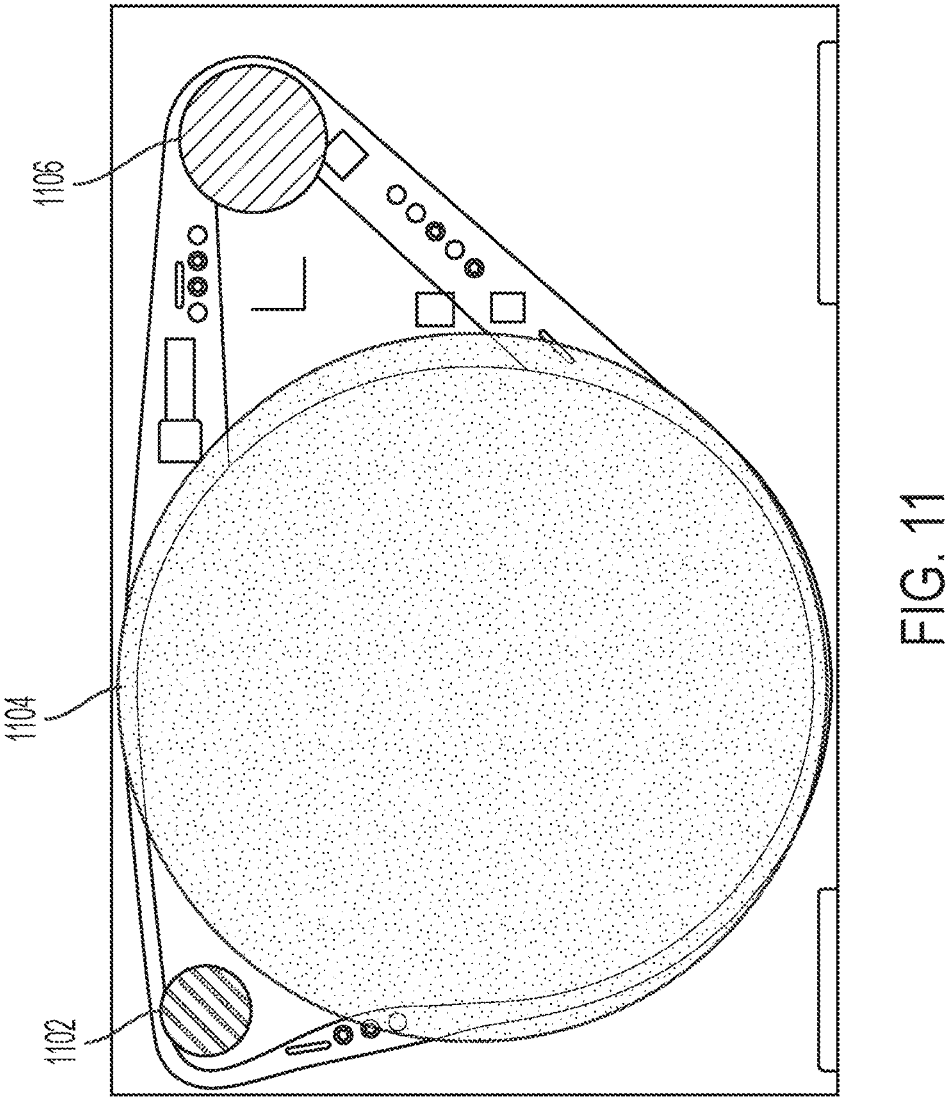
FIG. 11
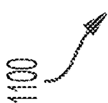

COVER ARCHITECTURES IN CURVED EYEPIECE STACKS FOR MIXED REALITY APPLICATIONS

CROSS-REFERENCE TO RELATED APPLICATIONS

This application is a national stage application under 35 U.S.C. § 371 of International Application No. PCT/US2022/71744, filed internationally on Apr. 15, 2022, which claims priority to U.S. Provisional Application No. 63/176,102, filed on Apr. 16, 2021, the contents of which are both incorporated by reference herein in its entirety.

FIELD

This disclosure relates in general to eyepiece stacks, and in particular to cover architectures in curved eyepiece stacks for mixed reality (MR) applications.

BACKGROUND

It may be desirable to use a curved cover layer in an eyepiece stack for MR applications. For example, the curved cover layer may accommodate curved waveguides of the eyepiece stack for improving optical performance. As another example, the curved cover layer may improve the eyepiece's structural properties. However, reflections created by the curved cover layer may create ghost images (e.g., a shifted reflection) for the viewer, and using high temperature (e.g., 100 C) deposition and/or vacuum deposition to create antireflective features for reducing the ghost images may be costly. Therefore, to more efficiently reap the benefits of a curved cover layer, less costly methods of creating antireflective features for the curved cover layer may be desired.

BRIEF SUMMARY

Examples of the disclosure describe eyepieces and methods of fabricating the eyepieces. In some embodiments, the eyepiece comprises a curved cover layer and a waveguide layer for propagating light. In some embodiments, the curved cover layer comprises an antireflective feature.

In some embodiments, the waveguide layer is curved.

In some embodiments, the eyepiece further comprises a second cover layer.

In some embodiments, the second cover layer is curved.

In some embodiments, the curved cover layer comprises a second antireflective feature.

In some embodiments, the antireflective feature is created by casting, using moth-eye film, by spin coating, by dip coating, or by spray coating.

In some embodiments, the cover layer is curved toward the waveguide layer.

In some embodiments, the cover layer is curved away from the waveguide layer.

In some embodiments, the light propagated in the waveguide layer is generated from a projector.

In some embodiments, a length of the curved cover layer is shorter than a length of the waveguide layer.

In some embodiments, the curved cover layer comprises a hole.

In some embodiments, a method for fabricating an eyepiece comprises: providing a waveguide layer for propagating light; and providing a curved cover layer.

In some embodiments, the waveguide layer is curved.

In some embodiments, the method further comprises providing a second cover layer.

In some embodiments, the second cover layer is curved.

In some embodiments, the method further comprises creating an antireflective feature on the curved cover layer.

In some embodiments, the antireflective feature is created by casting, using moth-eye film, by spin coating, by dip coating, or by spray coating.

In some embodiments, the cover layer is curved toward the waveguide layer.

In some embodiments, the cover layer is curved away from the waveguide layer.

In some embodiments, the method further comprises optically coupling a projector to the waveguide layer, wherein the projector generates the light propagated in the waveguide layer.

In some embodiments, a length of the curved cover layer is shorter than a length of the waveguide layer.

In some embodiments, the method further comprises forming a hole in the curved cover layer.

In some embodiments, a wearable head device comprises: a first eyepiece of any of the above eyepieces; and a second eyepiece of any of the above eyepieces.

BRIEF DESCRIPTION OF THE DRAWINGS

FIG. 11 illustrates an exemplary eyepiece stack, according to embodiments of the disclosure.

DETAILED DESCRIPTION

Figure 1A:
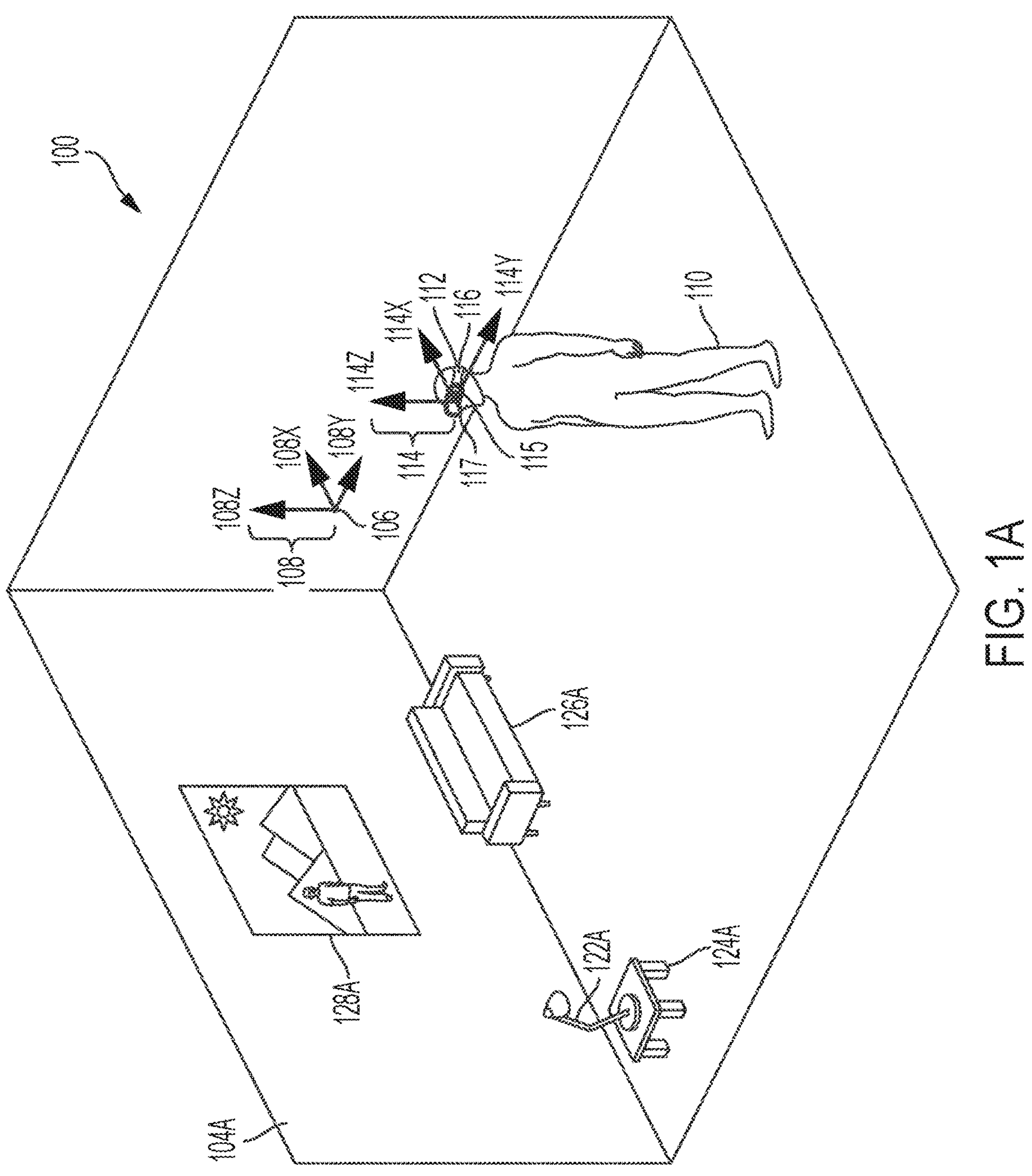
FIGS. 1A-1C illustrate exemplary environments, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment (MRE) that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

In some examples, virtual objects hay have characteristics that resemble corresponding real objects. For instance, a virtual character may be presented in a virtual or mixed reality environment as a life-like figure to provide a user an immersive mixed reality experience. With virtual characters having life-like characteristics, the user may feel like he or she is interacting with a real person. In such instances, it is desirable for actions such as muscle movements and gaze of the virtual character to appear natural. For example, movements of the virtual character should be similar to its corresponding real object (e.g., a virtual human should walk or move its arm like a real human). As another example, the gestures and positioning of the virtual human should appear natural, and the virtual human can initial interactions with the user (e.g., the virtual human can lead a collaborative experience with the user). Presentation of virtual characters having life-like characteristics is described in more detail herein.

Compared to virtual reality (VR) systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
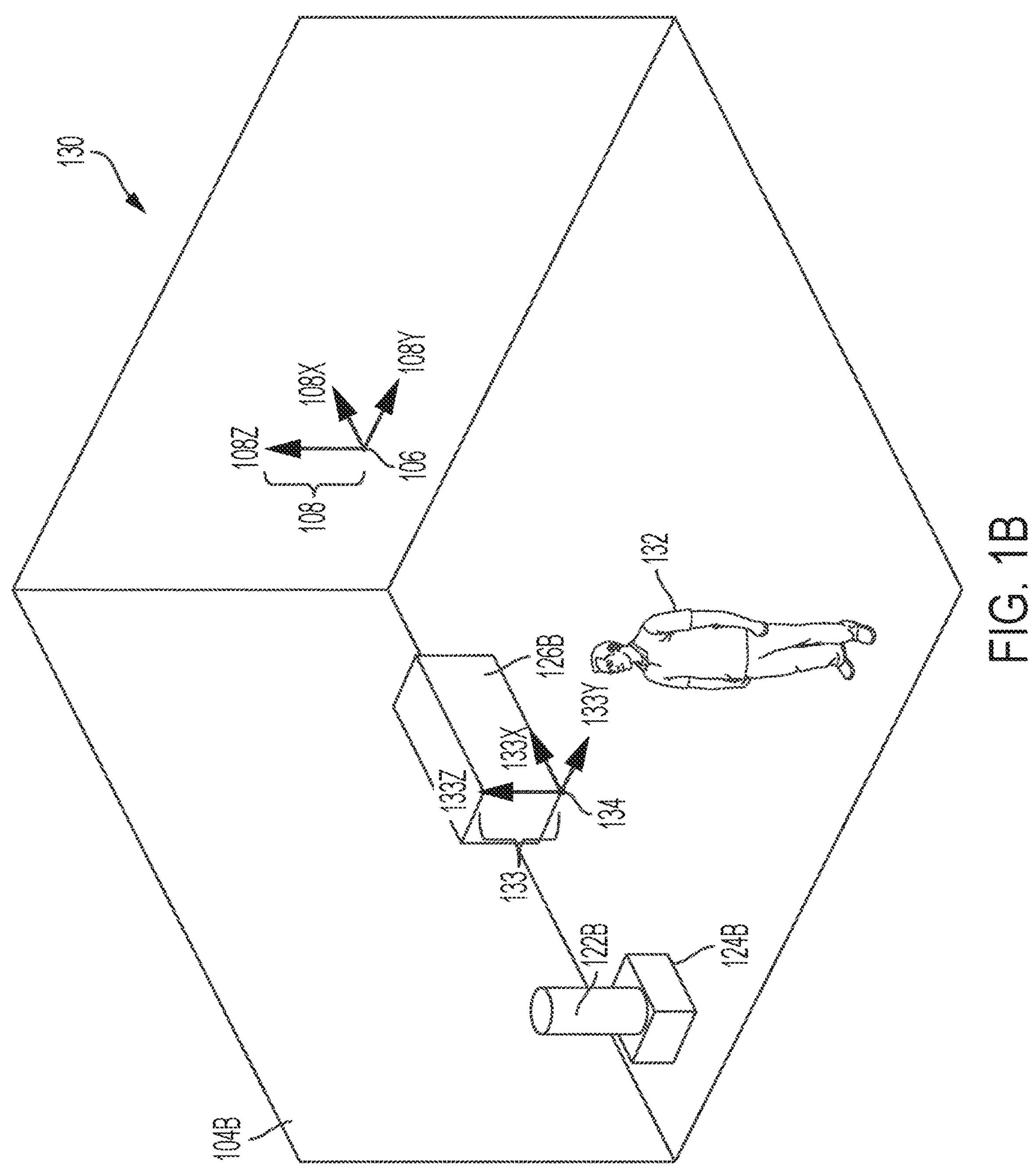

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual character 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
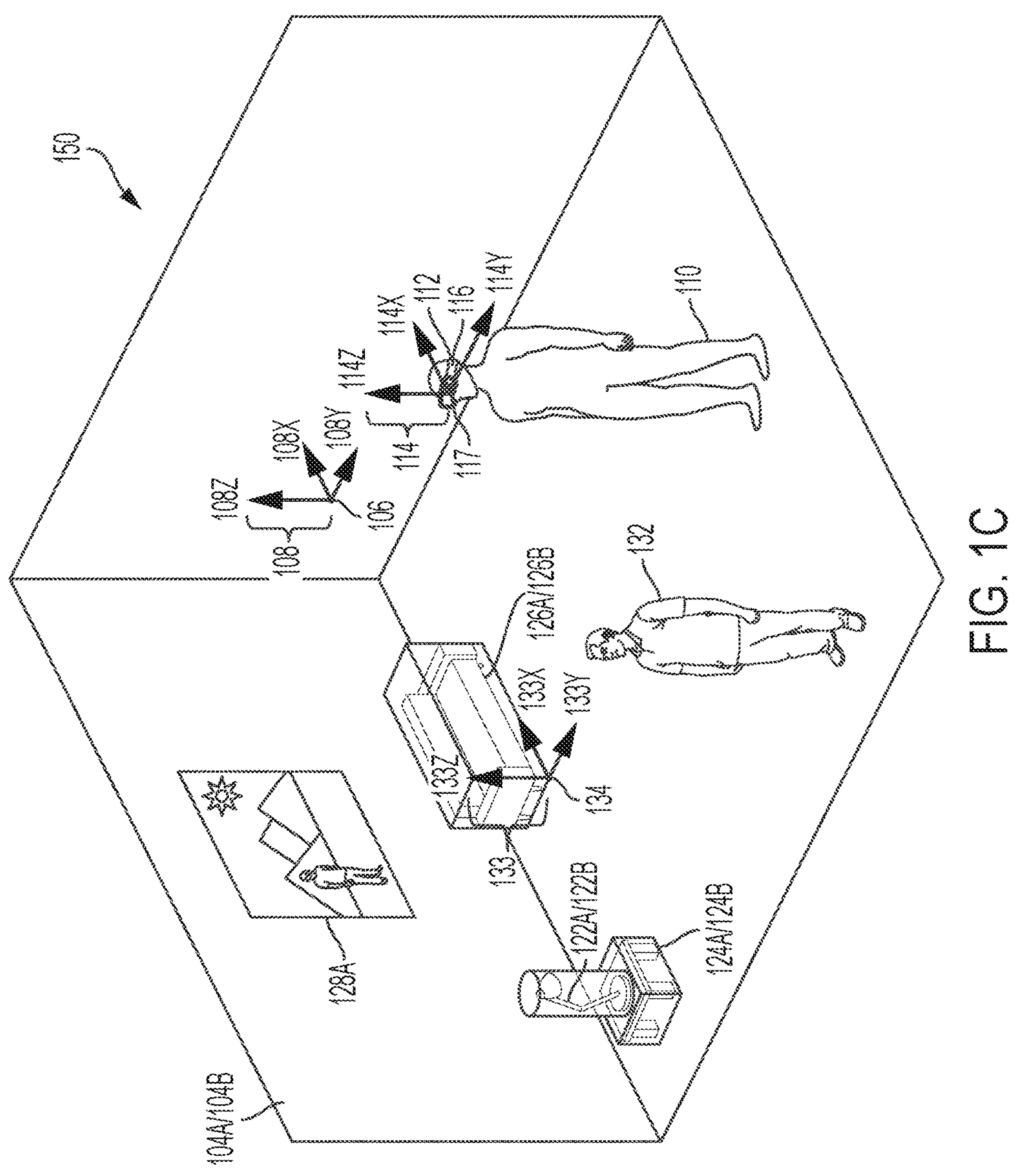

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects.

This information can enable or facilitate calculations involving a real object without incurring unnecessary computational overhead.

In some examples, the presentation described herein may also incorporate audio aspects. For instance, in MRE 150, virtual character 132 could be associated with one or more audio signals, such as a footstep sound effect that is generated as the character walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including neural networks (e.g., in the cloud) for data processing and training data associated with presentation of elements (e.g., virtual character 132) in the MRE 150 and other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

In some embodiments, an animation rig is used to present the virtual character 132 in the MRE 150. Although the animation rig is described with respect to virtual character 132, it is understood that the animation rig may be associated with other characters (e.g., a human character, an animal character, an abstract character) in the MRE 150. Movement of the animation rig is described in more detail herein.

Figure 2A:
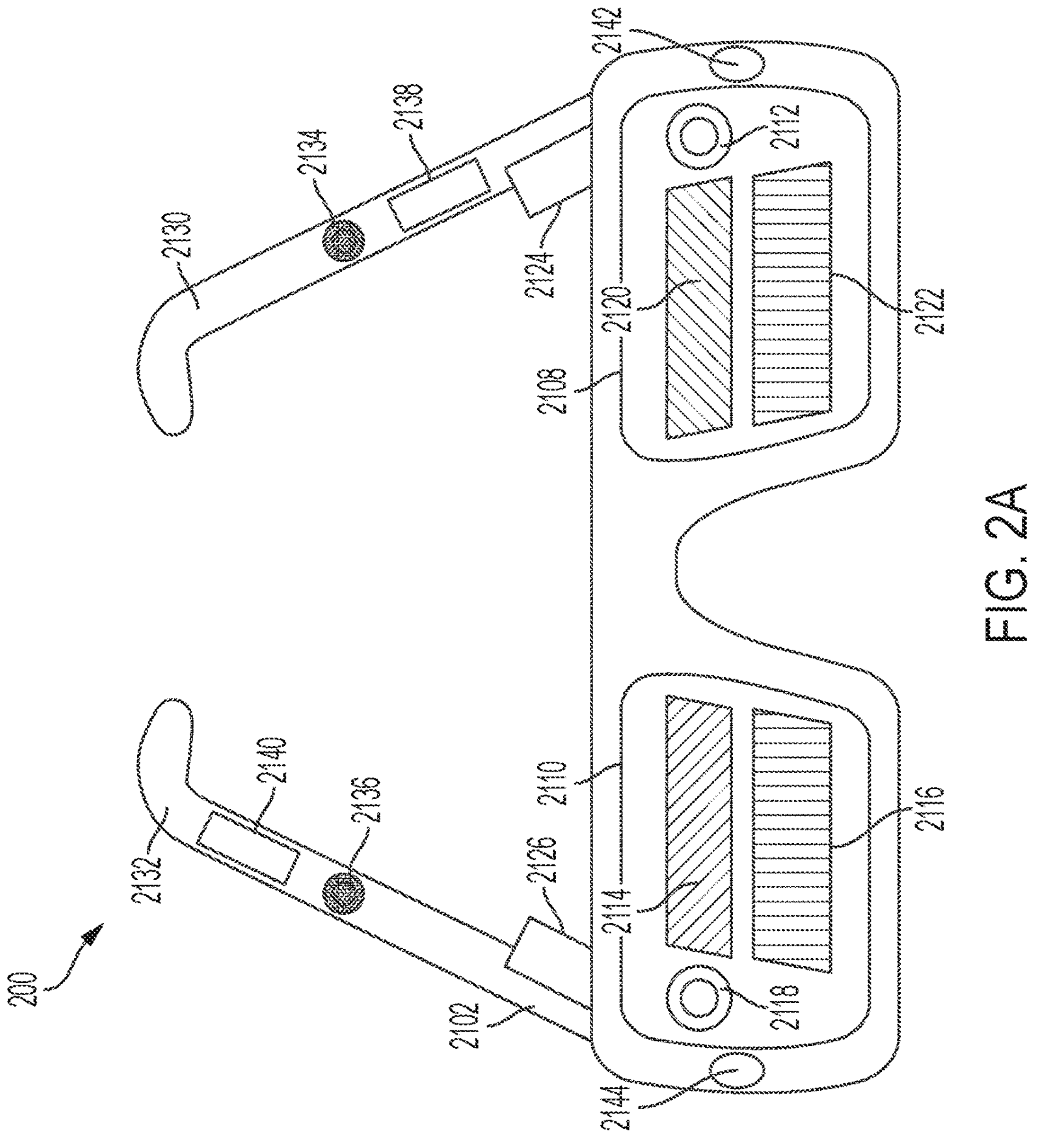
FIGS. 2A-2D illustrate components of exemplary mixed reality systems, according to embodiments of the disclosure.
Figure 2B:
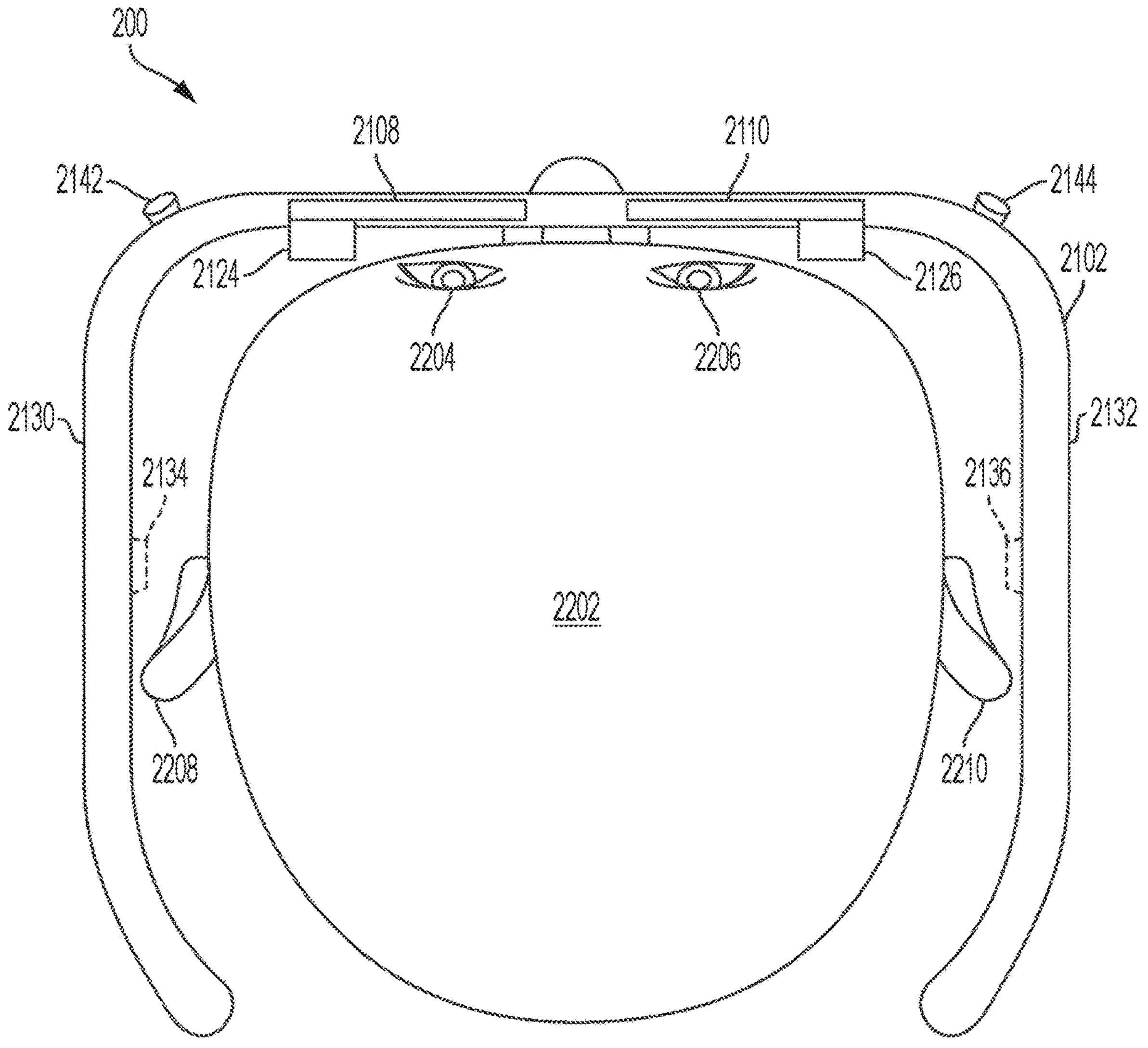
Figure 2C:
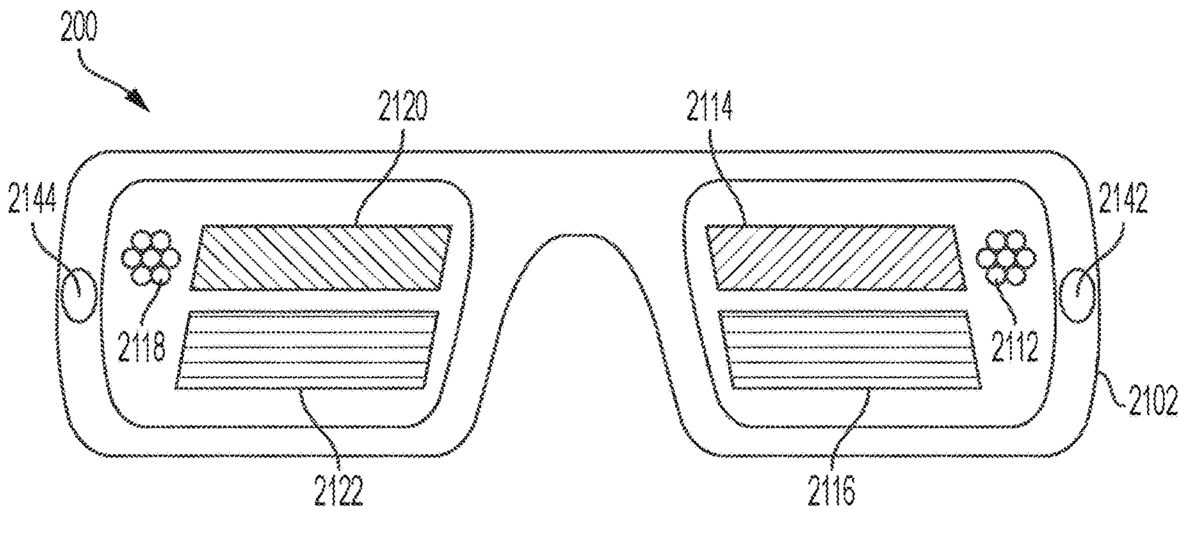
Figure 2D:
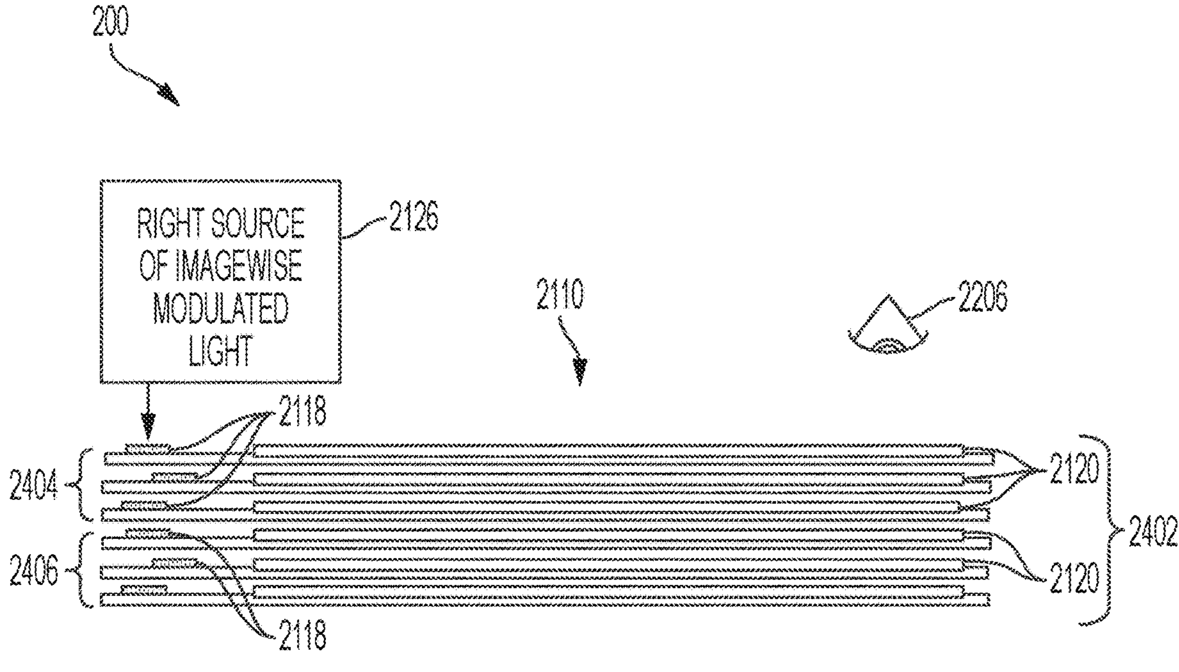

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. The eyepieces 2108 and 2110 may include a curve layer, as described herein. The eyepieces 2108 and 2110 may be an eyepiece disclosed with respect to FIGS. 6-12. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue. and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
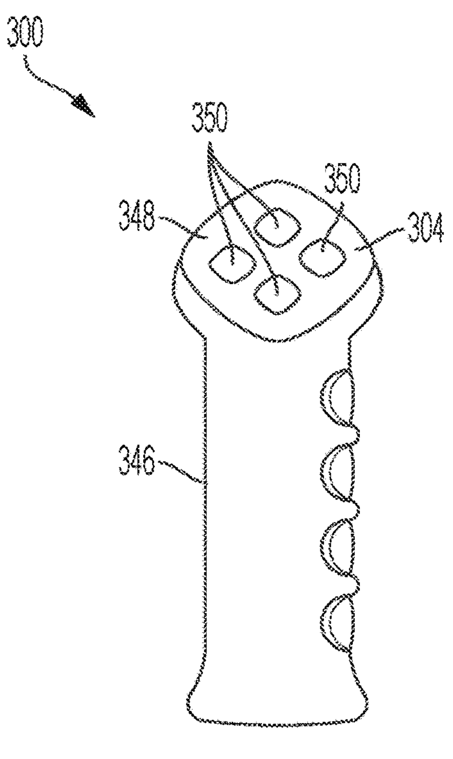
FIG. 3A illustrates an exemplary mixed reality handheld controller, according to embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6 DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
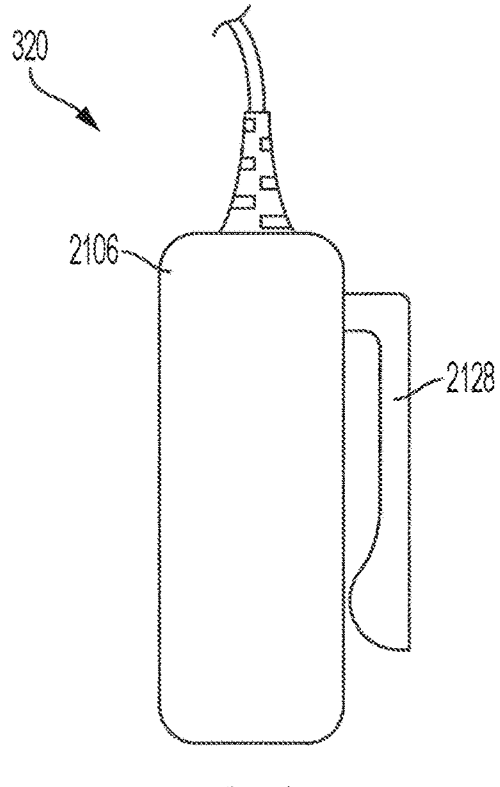
FIG. 3B illustrates an exemplary auxiliary unit, according to embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
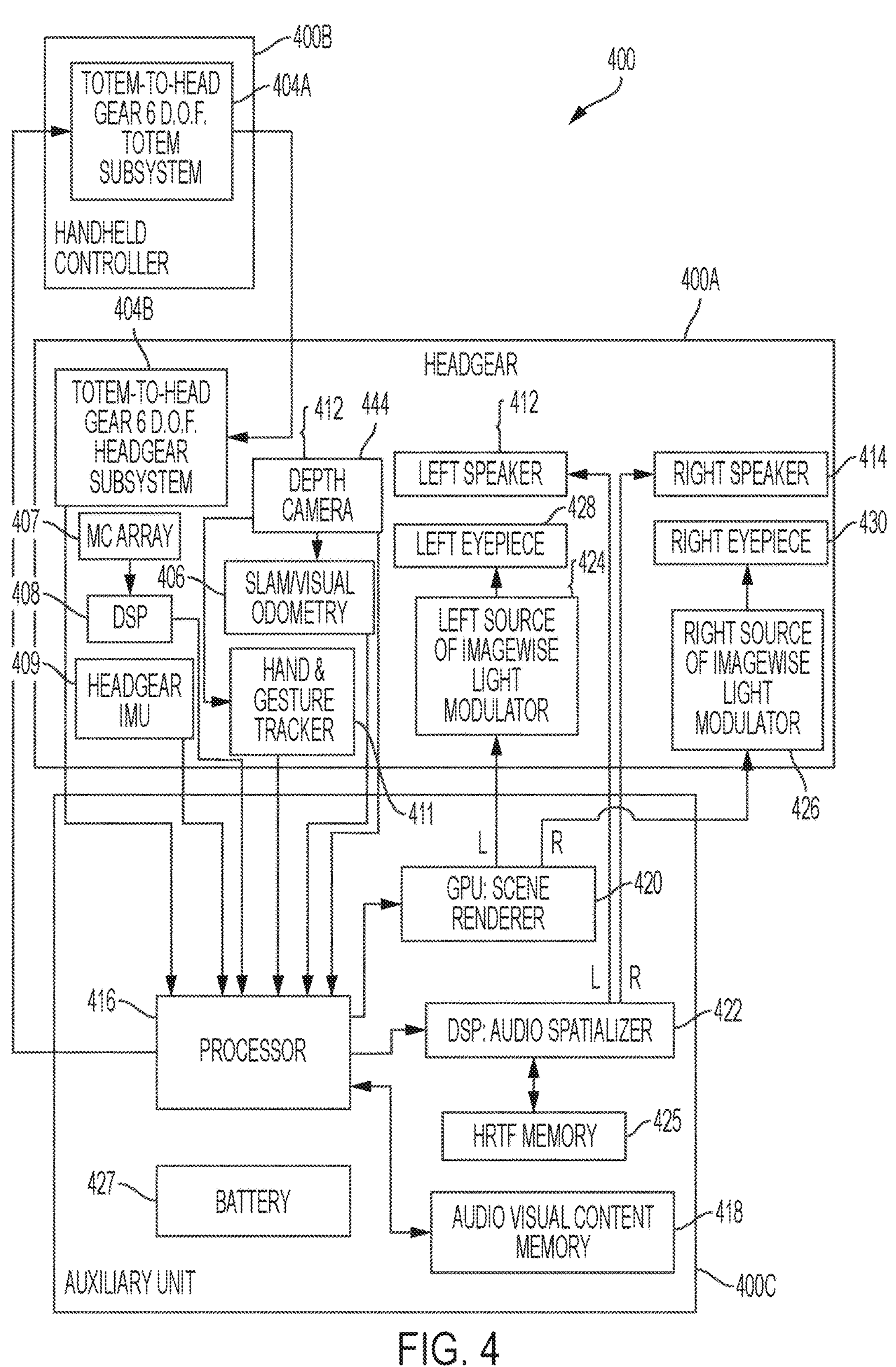
FIG. 4 illustrates an exemplary functional block diagram of an exemplary mixed reality system, according to embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). Elements of wearable system 400 may be used to implement the methods, operations, and features described in this disclosure. As shown in FIG. 4, example handheld controller 400B (which may correspond to handheld controller 300 (a "totem")) includes a totem-to-wearable head device six degree of freedom (6 DOF) totem subsystem 404A and example wearable head device 400A (which may correspond to wearable head device 2102) includes a totem-to-wearable head device 6 DOF subsystem 404B. In the example, the 6 DOF totem subsystem 404A and the 6 DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6 DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6 DOF of the wearable head device 400A relative to the handheld controller 400B may be determined. Additionally, 6 DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6 DOF headgear subsystem 404B, the IMU 409, the SLAM/visual odometry block 406, depth cameras 444, and/or the hand gesture tracker 411. The processor 416 can also send and receive control signals from the 6 DOF totem system 404A. The processor 416 may be coupled to the 6 DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 (e.g., for displaying content on left eyepiece 428) and a right channel output coupled to the right source of imagewise modulated light 426 (e.g., for displaying content on right eyepiece 430). The eyepieces 428 and 430 may include a curve layer, as described herein. The eyepieces 428 and 430 may be an eyepiece disclosed with respect to FIGS. 6-12. GPU 420 can output stereoscopic image data to the sources of imagewise modulated light 424, 426, for example as described herein with respect to FIGS. 2A-2D. In some examples, the GPU 420 may be used to render virtual elements in the MRE presented on the display of the wearable system 400. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Figure 5A:
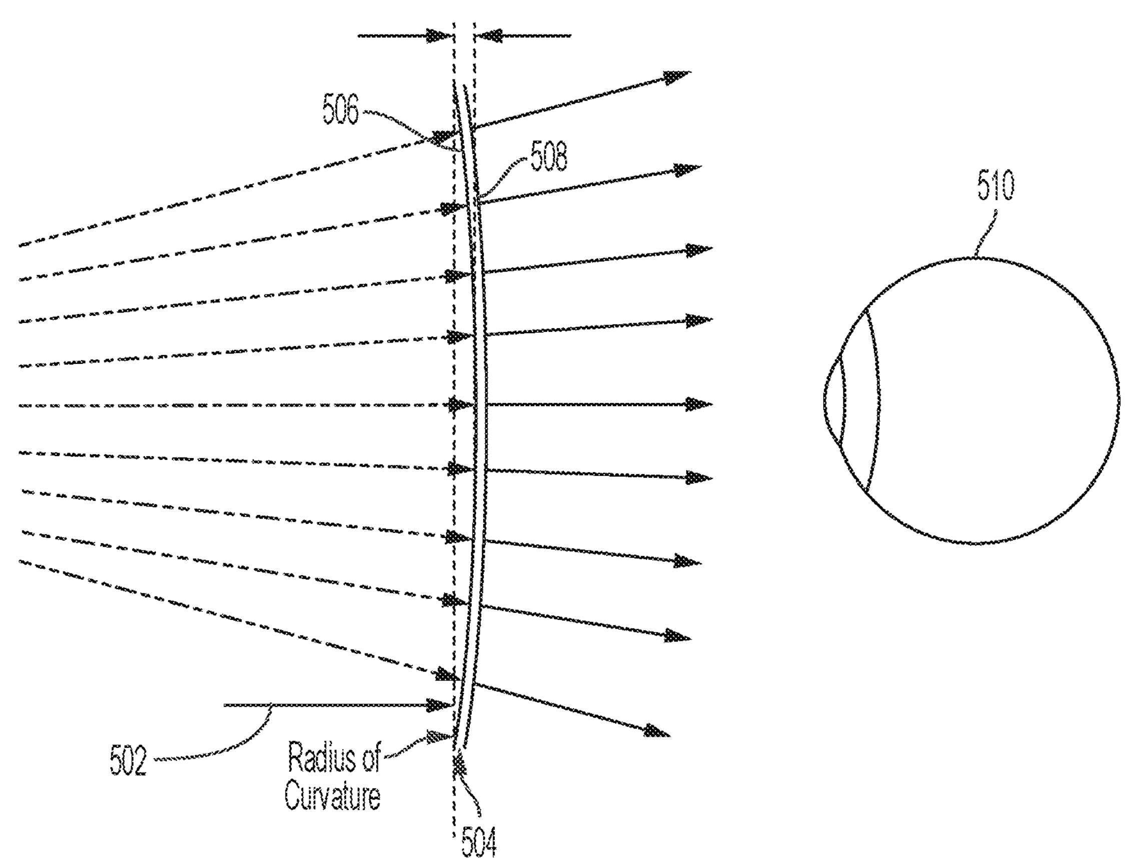
FIGS. 5A-5B illustrate an exemplary waveguide layer, according to embodiments of the disclosure.
Figure 5B:
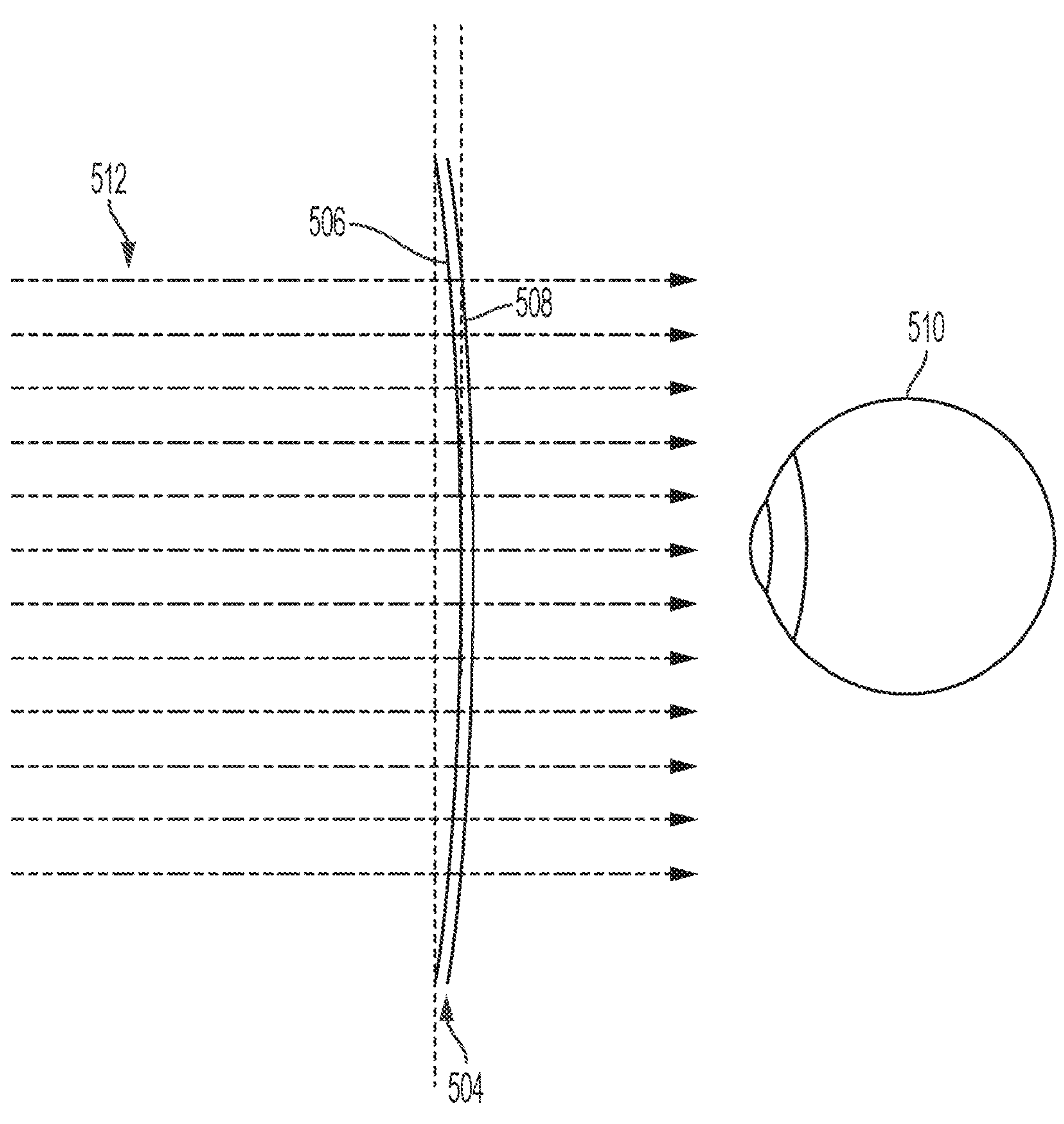

FIGS. 5A-5B illustrate an exemplary waveguide layer, according to embodiments of the disclosure. FIG. 5A is a simplified cross-sectional view of a waveguide layer of an eyepiece and light projected from the waveguide layer when the waveguide layer is characterized by a predetermined curvature according to some embodiments. The waveguide layer 504 may be a waveguide layer described with respect to FIGS. 6A-6C. Input light beam 502 from a light source, such as a projector (e.g., a projector described with respect to FIGS. 6A-6C, or a source of imagewise modulated light 2124, 2126, 424, or 426), can enter waveguide layer 504 through an input surface 506 (for example, by diffraction from an incoupling element (not shown)) and exit through an output surface 508 towards an eye 510 of a user. As illustrated in FIG. 5A, a surface profile characterizes waveguide layer 504. In some embodiments, the surface profile forms a curve, which can be defined by a radius of curvature for a spherical curvature. In some embodiments, the surface profile is aspheric, but can be approximated by a spherical surface shape. Because of the structure of waveguide layer 504, input surface 506 can be substantially parallel to output surface 508 throughout the length of waveguide layer 504.

As light propagates through waveguide layer 504 by total internal reflection (TIR), output light is diffracted out of waveguide layer 504 as illustrated by output rays. For low levels of curvature, input surface 506 and output surface 508 are substantially parallel to each other at positions across the waveguide layer. Accordingly, as light propagates through the waveguide layer by TIR, the parallel nature of the waveguide surfaces preserves the reflection angles during TIR so that the angle between the output ray and the output surface is preserved across the waveguide layer. Since the surface normals vary slightly across the curved waveguide layer output surface, the output rays also vary slightly, producing the divergence illustrated in FIG. 5A.

The divergence of output rays resulting from the curvature of output surface 508 can have the effect of rendering input light beam 502 so that it appears that light originates from a point source positioned at a particular distance behind waveguide layer 504. Accordingly, the surface profile or curvature of waveguide layer 504 produces a divergence of light toward the user's or viewer's eye 510, effectively rendering the light as originating from a depth plane positioned behind the waveguide layer with respect to the eye.

The distance from the waveguide layer at which the input light beam appears to originate can be associated with the radius of curvature of waveguide layer 504. A waveguide with a higher radius of curvature can render a light source as originating at a greater distance from waveguide layer than a waveguide with a lower radius of curvature. For example, as shown in FIG. 5A, waveguide layer 504 may have a radius of curvature of 0.5 m, which can be achieved, e.g., by a bowing of waveguide layer 504 by 0.4 mm across an EPE having a lateral dimension (e.g., length or width) of 40 mm. Given this example curvature of waveguide layer 504, input light beam 502 appears to originate at a distance of 0.5 m from waveguide layer 504. As another example, another waveguide layer can be operated to have a radius of curvature of 0.2 m, rendering a light source that appears to a user to be originating at a distance of 0.2 m from the waveguide layer. Accordingly, by utilizing a small amount of curvature, i.e., fractions of a millimeter of bow across a waveguide layer tens of millimeters in length/depth, which is compatible with waveguide layer materials, depth plane functionality can be implemented for two-dimensional expansion waveguides, also referred to as two-dimensional waveguides. The curvatures utilized according to embodiments of the present invention can be used in a variety of commercial products, including sunglasses, which can have several millimeters (e.g., 1-5 mm) of bow, vehicle windshields, and the like. Accordingly, the small amount of curvature utilized in various embodiments of the present invention will not degrade the optical performance of the eyepiece; for instance, examples can introduce less than 0.1 arcminute of blur at center field of view and less than 2 arcminutes of blur across the field of view of an eyepiece with 0.5 m radius of curvature.

FIG. 5A only illustrates a one-dimensional cross-sectional view of waveguide layer 504, which is an element of an eyepiece. However, it will be appreciated that the surface profile imposed on the waveguide layer can also be imposed in the direction orthogonal to the plane of the figure, resulting in a two-dimensional curvature of the waveguide layer. Embodiments of the present invention thus provide depth plane functionality to the structure of the eyepiece, particularly, the waveguide layers of the eyepiece. As described herein the depth plane functionality can be bi-modal or continuous depending on the particular implementation.

FIG. 5B is a simplified cross-sectional view of a waveguide layer of an eyepiece and light passing through the waveguide layer when the waveguide layer is characterized by a predetermined curvature according to some embodiments. As described with respect to FIG. 5A, light projected from the waveguide layer 504 can cause a light source to appear to an eye of a user in a three-dimensional space. Real-world light 512, or light not projected through waveguide layer 504 for the purposes of virtual reality (VR), augmented reality (AR), or mixed reality (MR), can pass through input surface 506 and output surface 508 of waveguide layer 504 and towards eye 510 of a user. A waveguide with low thickness variation (e.g., less than 1.0 μm) has negligible optical power and can allow real world light 512 to pass through the curved surface of waveguide layer 504 with little or no disturbance. In some embodiments, no correction of real-world light is required, and there is reduced or no off-axis degradation of real-world light caused by the surface profile of waveguide layer 504. Thus, the imposition of a surface profile or curvature on the waveguide layer allows for the projection of virtual content from positions at a distance from the eyepiece while maintaining the integrity of real-world light, thereby allowing both real-world light to be viewed by a user and, concurrently, virtual content to be rendered for the user in real-time in three-dimensional space.

In some embodiments, a radius of curvature of the waveguide layer, which can be a polymer waveguide layer, can be dynamically varied between a first distance (e.g., 0.1 m) and infinity, which can dynamically vary the depth planes (i.e., the distance at which a projected light source appears to be rendered) of the eyepiece as well between the first distance and infinity. Thus, embodiments of the present invention enable variation of depth planes between the first distance (e.g., 0.1 m) and infinity, which includes depth planes typically utilized in augmented or mixed reality applications. The surface profile of the waveguide layers, e.g., flexible polymer waveguide layers, can be adjusted using various methodologies and mechanisms as described in more detail herein.

In some embodiments, dynamic eyepieces are provided in which a depth plane of the eyepiece can be varied to display virtual content at different depth planes, for example, temporal variation as a function of time. Accordingly, subsequent frames of virtual content can be displayed, appearing to originate from different depth planes. However, static implementations are also included within the scope of the present invention. In these static implementations, a fixed and predetermined surface profile or curvature characterizes the waveguide layers of the eyepiece, thereby presenting the virtual content at a fixed depth plane. In contrast with some systems utilizing external lenses, diffractive lenses, or other optical elements, embodiments utilizing a static implementation can implement a depth plane through curvature of the waveguide layers, reducing system complexity, and improving optical quality. Moreover, some embodiments can implement a set of eyepieces, each eyepiece including a stack of curved waveguide layers to provide two static depth planes. As an example, a first stack of three curved waveguide layers could utilize a bow of 0.2 mm across the width/length of the waveguide stack to implement a three-color scene at a depth plane positioned at 1 m and a second stack of three curved waveguide layers could utilize a bow of 0.4 mm across the width/length of the waveguide stack to implement a second three-color scene at a depth plane positioned at 0.5 m. Other suitable dimensions are within the scope of the present invention. In addition, binocular systems as well as monocular systems are contemplated.

In some embodiments, waveguides of the disclosed eyepieces are as described in U.S. Patent Publication No. US2021/0011305, the entire disclosure of which is herein incorporated by reference. The disclosed waveguides may enhance presentation of images (e.g., mixed reality (MR) content) to a user by improving optical properties in a cost-effective manner.

It may be desirable to use a curved cover layer in an eyepiece stack for MR applications. For example, the curved cover layer may accommodate the curved waveguides for improving optical performance, as described above. As another example, the curved cover layer may improve the eyepiece's structural properties (e.g., improved geometric stiffness, improved response to thermo-mechanical loads).

Figure 6A:
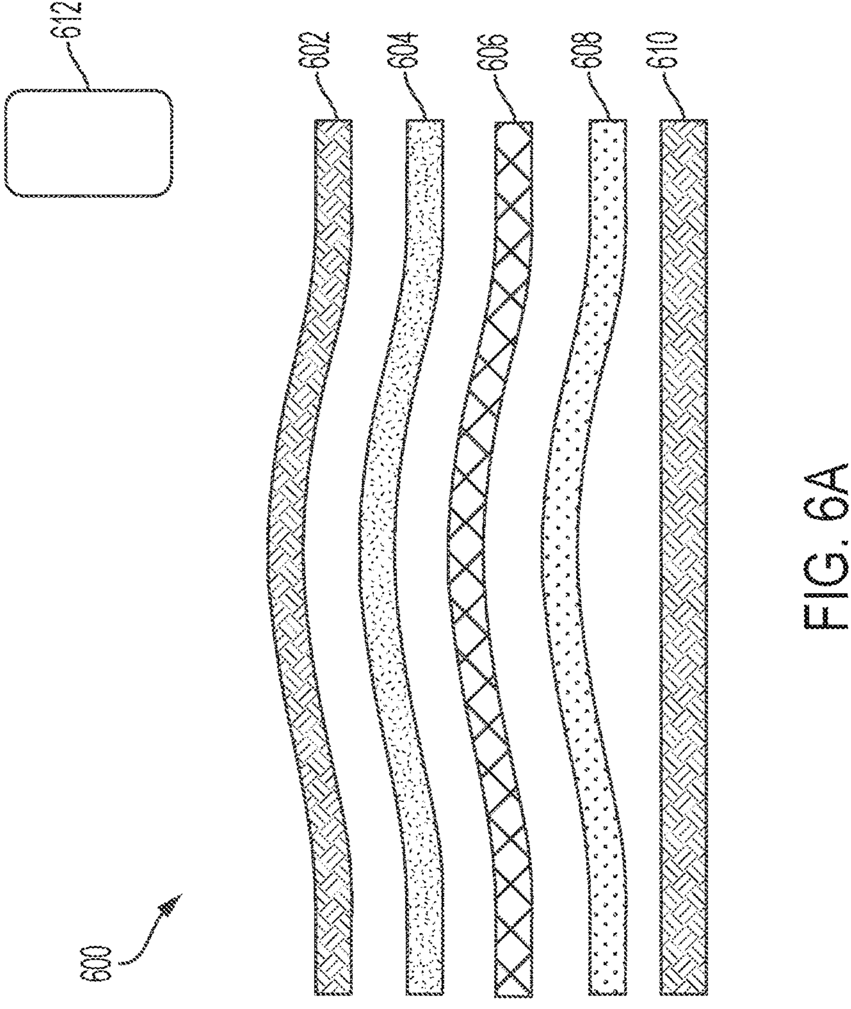
FIGS. 6A-6C illustrate exemplary eyepiece stacks, according to embodiments of the disclosure.
Figure 6B:
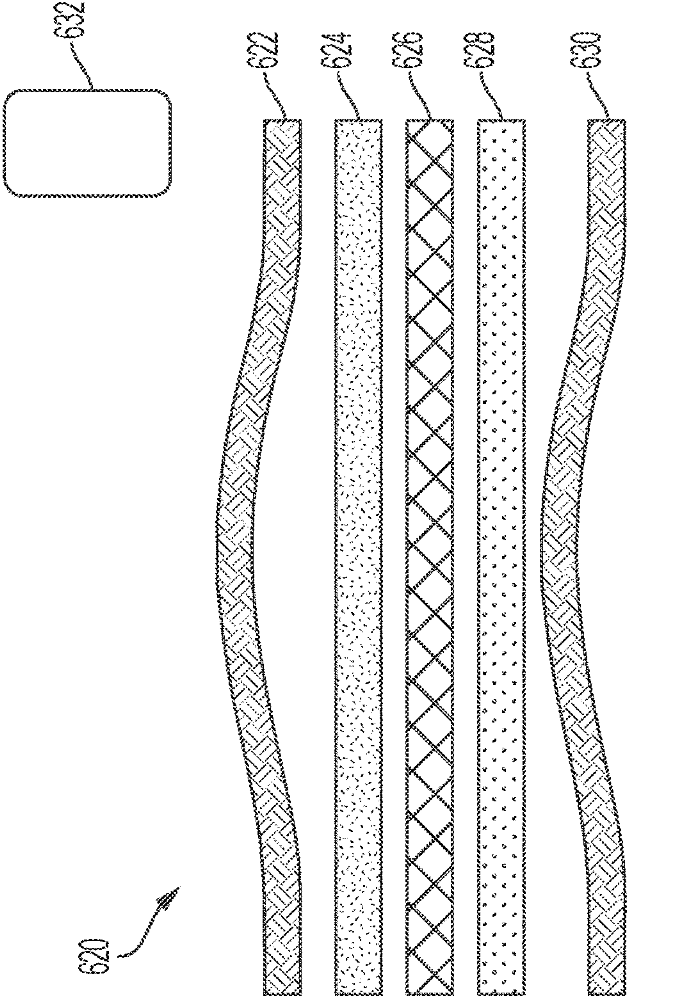
Figure 6C:
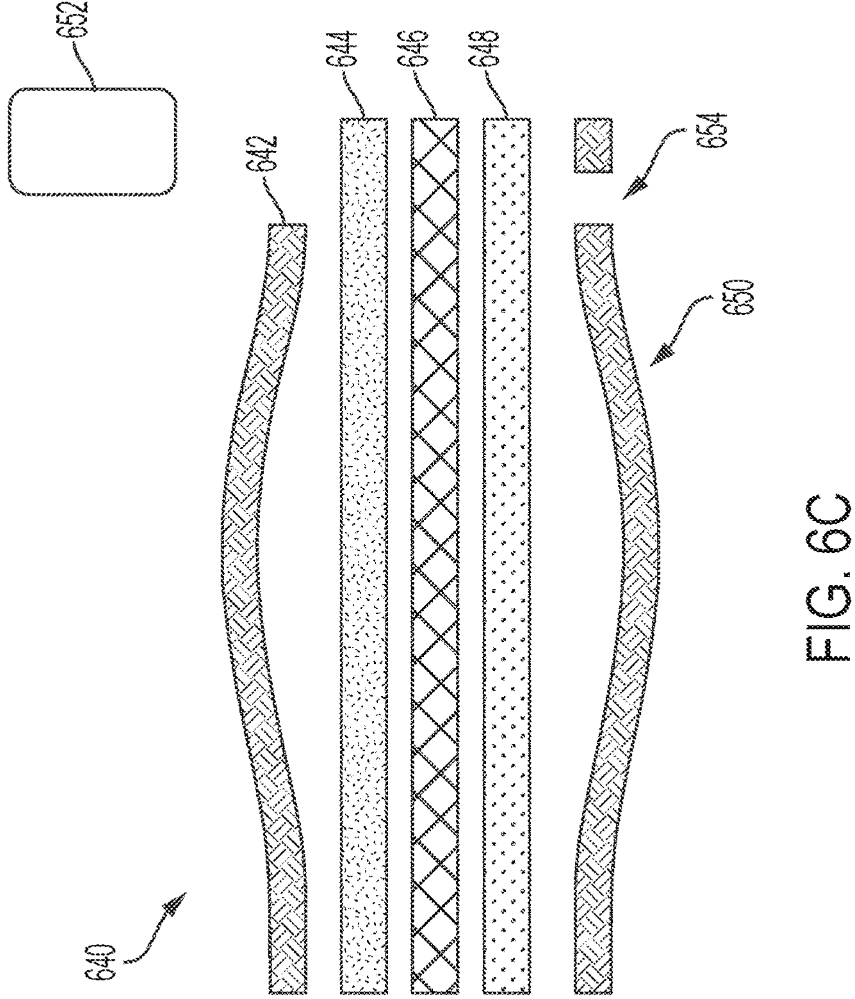

FIGS. 6A-6C illustrate exemplary eyepiece stacks, according to embodiments of the disclosure. FIGS. 6A-6C may illustrate a cross-sectional view of an eyepiece stack. In the figures, the top of the figures represents a world side (e.g., a side of the eyepiece more distal from a viewer of a wearable head device comprising the eyepiece), and the bottom of the figures represents a viewer side (e.g., a side of the eyepiece more proximal to a viewer of a wearable head device comprising the eyepiece). A first cover layer may be associated with the world side, and a second cover layer may be associated with the viewer side.

Although the disclosed eyepieces are illustrated as including the described elements, it is understood that different combination of elements, additional elements, or fewer elements may be included in the eyepieces without departing from the scope of the disclosure. For example, the eyepieces may include additional or fewer waveguide layers. As another example, one or both cover layers may be curved. As yet another example, one or both cover layers may curve toward or away from the waveguide layers. As yet another example, one or both cover layers may be truncated (such as described in more detail below). As yet another example, one or both cover layers may comprise a hole (such as described in more detail below). As yet another example, the eyepiece may include combinations of cover layer and/or waveguide layer features such as described with respect to FIGS. 6A-6C.

FIG. 6A illustrates an exemplary eyepiece stack 600. In some embodiments, as illustrated, the eyepiece stack 600 includes first cover layer 602, first waveguide layer 604, second waveguide layer 606, third waveguide layer 608, and second cover layer 610. As illustrated, the first cover layer 602 may be a curved cover layer, and the second cover layer 610 may be a non-curved (e.g., flat) cover layer. The first cover layer 602 may be curved away from the waveguide layers, as illustrated. For example, over a length of 4 cm, a difference between a peak and a trough of the curved cover layer may be approximately 1 mm. In some embodiments, a radius of curvature of the curved cover layer is 0.1 m-1 m. In some embodiments, a radius of curvature of the curved cover layer is greater than 1 m (e.g., up to infinity) to cover depth planes needed for MR applications. The radius of curvature may be measured by projecting light through a curved layer and measuring a focal length of the projection (e.g., focal length=radius of curvature/2). Similarly, a depth plane for a particular MR application may be met by adjusting a curvature of the eyepiece stack to a corresponding focal length. In some embodiments, a curvature of the first cover layer reduces a gap between the first cover layer and an adjacent curved waveguide layer, reducing a probability of the two layers touching (e.g., and interfering with the light propagating in the waveguide layer) and/or reducing a probability of eyepiece structural instability (e.g., wobbling), compared to a non-curved first cover layer.

In some embodiments, the first cover layer 602 and/or the second cover layer 610 comprise an antireflective feature. An antireflective feature may be a geometric feature or a material of a cover layer, and the geometric feature or the material is configured to reduce reflection of incoming radiation having a particular wavelength, compared to a cover layer without the geometric feature. The geometric feature or the material may be formed as described with respect to FIGS. 7-9. The antireflective feature may be an antireflective feature described herein (e.g., described with respect to FIGS. 7-12). As an exemplary advantage, the disclosed antireflective feature may allow a curved cover layer to be more efficiently implemented to accommodate curved waveguides and/or increase structural strength of the eyepiece (e.g., improved geometric stiffness, improved response to thermo-mechanical loads). For instance, the disclosed antireflective feature may reduce ghost images (e.g., compared to a curved cover layer having weaker antireflective properties, from a ghost ratio of 230:1 (e.g., for a polymer cover layer without an antireflective feature (e.g., refractive index=1.75)) down to 13.5:1), and may be created without using high temperature deposition or vacuum deposition, reducing eyepiece fabrication cost and/or complexity (e.g., by reducing a costly fabrication step).

In some embodiments, the waveguide layers 604, 606, 608 are curved waveguide layers. The first waveguide layer 604 may be a waveguide for blue light. The second waveguide layer 606 may be a waveguide for green light. The third waveguide layer 608 may be a waveguide for red light. It is understood that the waveguide layers may be arranged differently than described. For example, the eyepiece may include more or fewer waveguide layers. As another example, the first, second, and/or third waveguide layers may be a waveguide for other suitable color wavelengths than described above.

In some embodiments, light propagating in the waveguide layers is provided by projector 612. The projector 612 may be a projector for presenting MR content to a user of a wearable head device, such as described above. For example, the projector 612 is a spatial light modulator. The projector 612 may be source of imagewise modulated light 2124, 2126, 424, or 426.

FIG. 6B illustrates an exemplary eyepiece stack 620. In some embodiments, as illustrated, the eyepiece stack 620 includes first cover layer 622, first waveguide layer 624, second waveguide layer 626, third waveguide layer 628, and second cover layer 630. As illustrated, the first cover layer 622 and the second cover layer 630 may be curved cover layers. The first cover layer 622 may be curved away from the waveguide layers, and the second cover layer 630 may be curved toward the waveguide layers, as illustrated. For example, over a length of 4 cm, a difference between a peak and a trough of a curved cover layer may be 1 mm. In some embodiments, the curvatures of the first cover layer and the second cover layer allow geometric stiffness of the eyepiece stack to be improved, compared to an eyepiece stack that comprises non-curved (e.g., flat) first and second cover layers.

In some embodiments, the first cover layer 622 and/or the second cover layer 630 comprise an antireflective feature. The antireflective feature may be an antireflective feature described herein (e.g., described with respect to FIGS. 7-12). As an exemplary advantage, the disclosed antireflective feature may allow a curved cover layer to be more efficiently implemented to accommodate curved waveguides and/or increase structural strength of the eyepiece (e.g., improved geometric stiffness, improved response to thermo-mechanical loads). For instance, the disclosed antireflective feature may reduce ghost images (e.g., compare to a curved cover layer having weaker antireflective properties), and may be created without using high temperature deposition or vacuum deposition, reducing eyepiece fabrication cost and/or complexity (e.g., by reducing a costly fabrication step).

In some embodiments, the waveguide layers 624, 626, 628 are non-curved (e.g., flat) waveguide layers. The first waveguide layer 624 may be a waveguide for blue light. The second waveguide layer 626 may be a waveguide for green light. The third waveguide layer 628 may be a waveguide for red light. It is understood that the waveguide layers may be arranged differently than described. For example, the eyepiece may include more or fewer waveguide layers. As another example, the first, second, and/or third waveguide layers may be a waveguide for other suitable color wavelengths than described above.

In some embodiments, light propagating in the waveguide layers is provided by projector 632. The projector 632 may be a projector for presenting MR content to a user of a wearable head device, such as described above. For example, the projector 632 may comprise a spatial light modulator. The projector 632 may be a source of imagewise modulated light 2124, 2126, 424, or 426.

FIG. 6C illustrates an exemplary eyepiece stack 640. In some embodiments, as illustrated, the eyepiece stack 640 includes first cover layer 642, first waveguide layer 644, second waveguide layer 646, third waveguide layer 648, and second cover layer 650. As illustrated, the first cover layer 642 and the second cover layer 650 may be curved cover layers. The first cover layer 642 and the second cover layer 650 may be curved away from the waveguide layers, as illustrated. For example, over a length of 4 cm, a difference between a peak and a trough of a curved cover layer may be 1 mm. In some embodiments, the curvatures of the first cover layer and the second cover layer allow geometric stiffness of the eyepiece stack to be improved, compared to an eyepiece stack that comprises non-curved (e.g., flat) first and second cover layers.

In some embodiments, the first cover layer 642 and/or the second cover layer 650 comprise an antireflective feature. The antireflective feature may be an antireflective feature described herein (e.g., described with respect to FIGS. 7-12). As an exemplary advantage, the disclosed antireflective feature may allow a curved cover layer to be more efficiently implemented to accommodate curved waveguides and/or increase structural strength of the eyepiece (e.g., improved geometric stiffness, improved response to thermos-mechanical loads). For instance, the disclosed antireflective feature may reduce ghost images (e.g., compare to a curved cover layer having weaker antireflective properties), and may be created without using high temperature deposition or vacuum deposition, reducing eyepiece fabrication cost and/or complexity (e.g., by reducing a costly fabrication step).

In some embodiments, the waveguide layers 644, 646, 648 are non-curved (e.g., flat) waveguide layers. The first waveguide layer 644 may be a waveguide for blue light. The second waveguide layer 646 may be a waveguide for green light. The third waveguide layer 648 may be a waveguide for red light. It is understood that the waveguide layers may be arranged differently than described. For example, the eyepiece may include more or fewer waveguide layers. As another example, the first, second, and/or third waveguide layers may be a waveguide for other suitable color wavelengths than described above.

In some embodiments, light propagating in the waveguide layers is provided by projector 652. The projector 652 may be a projector for presenting MR content to a user of a wearable head device, such as described above. For example, the projector 652 may comprise a spatial light modulator. The projector 652 may be a source of imagewise modulated light 2124, 2126, 424, or 426.

In some embodiments, a length of a cover layer (e.g., a distance between two ends of a cover layer) is shorter than a length of a waveguide layer (e.g., a distance between two ends of a waveguide layer). That is, the curved cover layer is truncated, relative to a waveguide layer. The truncation may be created by cutting or casting. For example, as illustrated, a length of the curved cover layer 642 (e.g., a distance between two ends of the curved cover layer) is shorter than a length of a waveguide layer 644, 646, or 648 (e.g., a distance between two ends of a waveguide layer). In some embodiments, a cover layer comprises a hole. For example, as illustrated, the second cover layer 650 comprises a hole 654. In some embodiments, the cover layer comprises more than one hole.

In some embodiments, the truncated cover layer and/or the hole may allow the projector to be located closer to the waveguide layers, reducing a required size and/or power requirement of the projector and reducing an optical path length. For example, by truncating the cover layer and/or creating the hole, more space is freed closer to the waveguide layers, allowing at least a part of the projector to be located closer to the waveguide layers (e.g., part of the projector is placed at the truncated portion or the hole). By allowing the projector to be located closer to the waveguide layers and reducing the projector's required size, cost, weight, and/or power consumption of a system (e.g., an MR system, a wearable head device) may be reduced.

Reflections created by the curved cover layer may create ghost images (e.g., shifted reflections) for the viewer, and using high temperature deposition and/or vacuum deposition to create antireflective features for reducing the ghost images may be costly. Therefore, to more efficiently reap the benefits of a curved cover layer, less costly methods of creating antireflective features for the curved cover layer may be desired.

Figure 7:
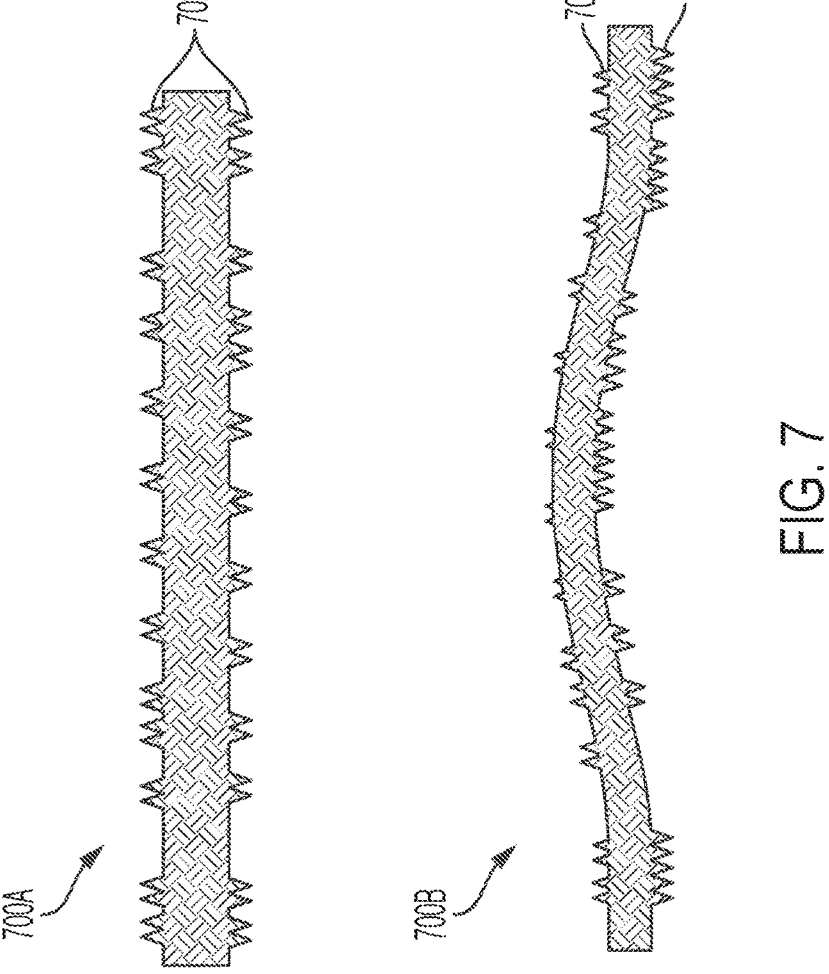
FIG. 7 illustrates an exemplary cover layer, according to embodiments of the disclosure.

FIG. 7 illustrates an exemplary cover layer (e.g., non-curved cover layer 700A, curved cover layer 700B), according to embodiments of the disclosure. In some embodiments, the cover layer is a cover layer described with respect to FIGS. 6A-6C. In some embodiments, the cover layer comprises polymer (e.g., a different polymer as a polymer in a waveguide layer, a same polymer as a polymer in a waveguide layer). In some embodiments, the cover layer includes antireflective feature 702. The antireflective feature 702 may be created on one or both sides of a cover layer. For brevity, some advantages of the antireflective feature described with respect to other Figures are not repeated here.

In some embodiments, the antireflective feature 702 is created by casting. For example, the antireflective feature 702 may be created using a casting process for antireflective gratings (e.g., using a mold). As an example, a process similar to a process for casting surface relief gratings into high index polymer for waveguides may be used to create the grating structures. The casting process creates patterns (e.g., gratings) on surfaces of the cover layer, and the patterns are configured to reduce light reflection off a corresponding surface.

For example, binary antireflective gratings (e.g., a periodic structure resembling a square wave in a cross-sectional view) with a height of 85 nm and 50% of a period at the height can result in surface reflectivity values of 2.9% for blue wavelength, 1.7% for green wavelength, and 2.5% for red wavelength. The binary antireflective grating heights may be a quarter of the incident light wavelength. As another example, binary antireflective gratings with a height of 100 nm and 35% of a period at the height can result in surface reflectivity values of 2.7% for blue, 0.7% for green, and 1.4% for red wavelengths. As yet another example, customizing heights of the binary grating for each wavelength (80 nm for blue, 100 nm for green, 120 nm for red) and a 35% of a period at the respective height can yield a 0.7% reflectivity for blue, green, and red wavelengths. In some embodiments, the refractive index a bulk polymer to be casted (e.g., a cover layer material without an antireflective feature) ranges from 1.4 to 1.9, and heights of the binary gratings and a percentage of a period at the height may be tailored to produce the desired antireflective properties.

By creating the antireflective feature by casting, more costly and/or complex antireflective feature creation processes, such as high temperature deposition and/or vacuum deposition, may not be required, reducing eyepiece fabrication cost and/or complexity (e.g., by reducing a costly step, by not requiring an additional step). Additionally, by creating the antireflective feature by casting and forgoing high temperature deposition, a less expensive cover layer (e.g., a non-curved polymer cover layer, a curved polymer cover layer) with desired antireflective properties (e.g., to reduce ghost images) may be created for the eyepiece, because the high temperature deposition process may damage such cover layers (e.g., the high temperature deposition process may damage the polymer cover layer). Additionally, the antireflective feature 702 may be controlled across the cover layer to achieve desired antireflective properties.

Figure 8:
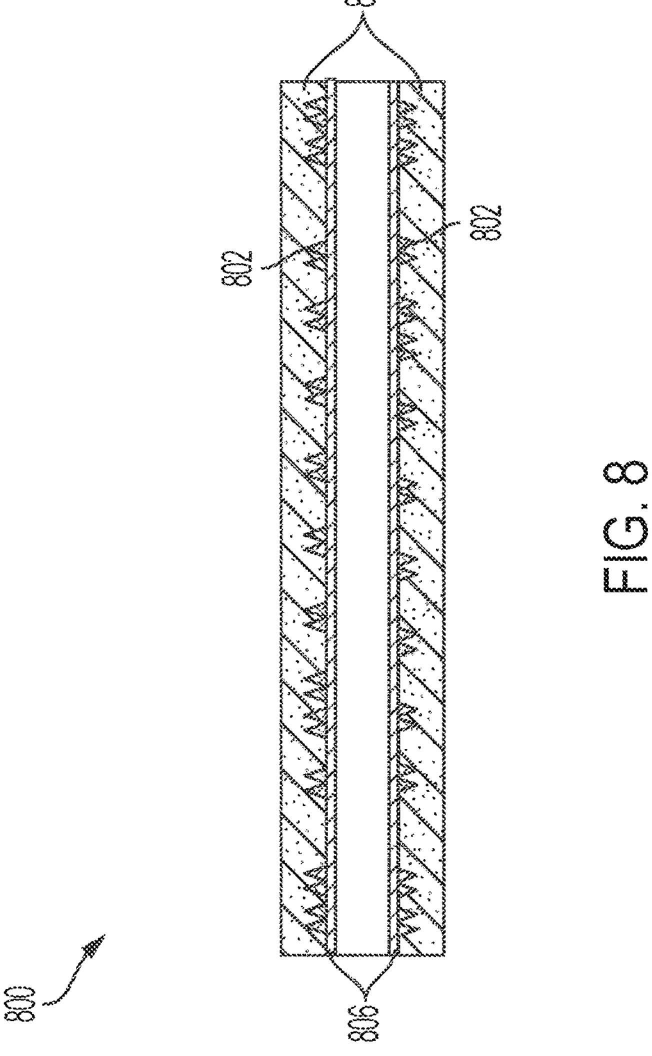
FIG. 8 illustrates an exemplary cover layer, according to embodiments of the disclosure.

FIG. 8 illustrates an exemplary cover layer 800, according to embodiments of the disclosure. In some embodiments, the cover layer 800 is a cover layer such as described with respect to FIGS. 6A-6C. Although the cover layer 800 is illustrated as not being curved, it is understood that antireflective feature described with respect to FIG. 8 may be created for a curved cover layer (e.g., a cover layer described with respect to FIGS. 6A-6C).

In some embodiments, as illustrated, the cover layer 800 includes antireflective feature 802, protection film 804, and film layer 806. The antireflective feature 802 may be created on one or both sides of a cover layer. For brevity, some advantages of the antireflective feature described with respect to other Figures are not described here. In some embodiments, the cover layer 800 comprises glass. In some embodiments, the antireflective feature 802 comprises a moth eye structure. In some embodiments, the film layer 806 is a carrier film or an optically clear adhesive (OCA) film for adhering or laminating the antireflective feature 802 (e.g., moth eye structure) to the cover layer. For example, the moth eye structure comprises a pattern of subwavelength bumps, which reduce reflection by creating an effective refractive index gradient between air and a medium (e.g., cover layer substrate). The cover layer 800 advantageously leverages the moth-eye structure, which is one of the most effective nanostructures, to reduce reflection and ghost images. The geometry of the moth-eye structure can be spatially averaged across a height of the antireflective feature to achieve a gradual index change.

In some embodiments, the moth-eye structure is fabricated on a film (e.g., a base film). The base film adheres or laminates to film layer 806 (e.g., a carrier film, an OCA film) and to the substrate of the cover layer 800. When the moth-eye structure is adhered or laminated to the film layer 806, the base film may be removed (e.g., peeled off), leaving the moth-eye structure on the cover layer substrate. In some embodiments, the base film is the protection film 804 (e.g., allowing an extra layer of protection for the cover layer 800 (e.g., for shipping, for storage)), and is not removed after the moth-eye structure is created on the cover layer substrate (e.g., and may be peeled off after shipping or after storage). In some embodiments, the protection film 804 advantageously has hydrophobic properties, allowing an eyepiece comprising the cover layer 800 to be hydrophobic.

By creating the antireflective feature by adhesion or lamination (e.g., by adhering or laminating the moth eye structure), more costly and/or complex antireflective feature creation processes, such as high temperature deposition and/or vacuum deposition, may not be required, reducing eyepiece fabrication cost and/or complexity (e.g., by reducing a costly step). Additionally, the moth-eye structure material may be a different material than a cover substrate, allowing the antireflective feature to include properties such as pencil hardness.

Figure 9:
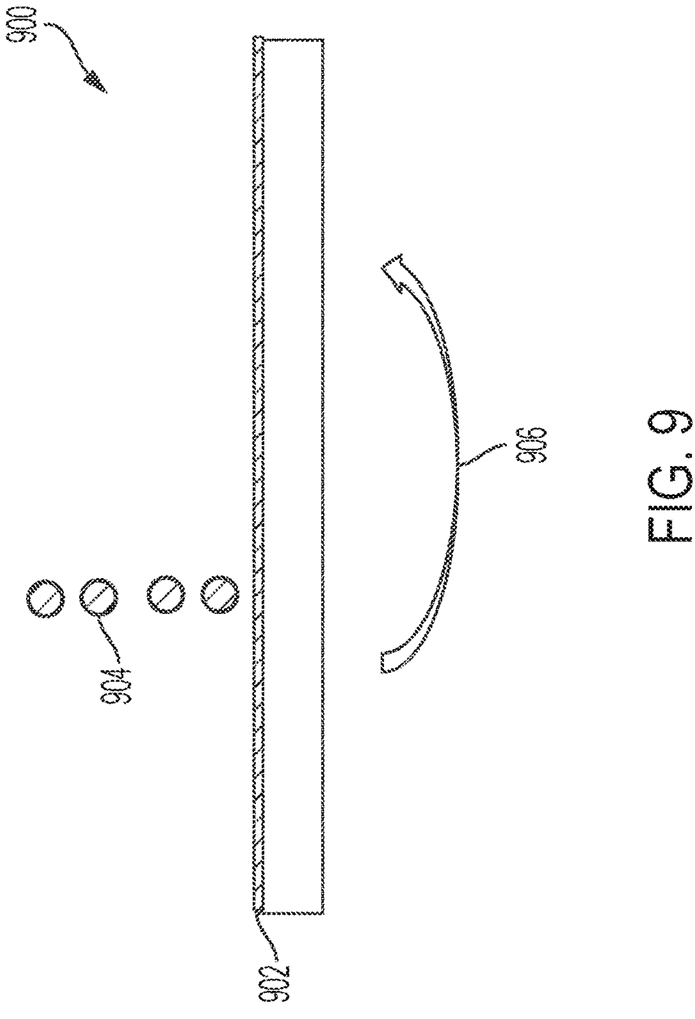
FIG. 9 illustrates an exemplary cover layer, according to embodiments of the disclosure.

FIG. 9 illustrates an exemplary cover layer 900, according to embodiments of the disclosure. In some embodiments, the cover layer 900 is a cover layer described with respect to FIGS. 6A-6C. Although the cover layer 900 is illustrated as not being curved, it is understood that the antireflective feature described with respect to FIG. 9 may be created for a curved cover layer (e.g., a cover layer described with respect to FIGS. 6A-6C).

In some embodiments, as illustrated, the cover layer 900 includes antireflective feature 902. The antireflective feature 902 may be created on one or both sides of a cover layer. For brevity, some advantages of the antireflective feature described with respect to other Figures are not repeated here. The antireflective feature 902 may be coated (e.g., using a low refractive index coating, using a coating allowing a gradual transition of refractive index from low to high across a height of the antireflective feature). For example, the antireflective feature 902 may be created by spin coating, dip coating, spray coating, or the like. A liquid precursor may be applied to form a single low refractive index film at atmospheric pressure. The liquid precursor is applied by spin-coating, dip coating, spray coating, or the like to one or both surfaces of a polymer cover layer (e.g., a curved cover layer, a non-curved cover layer). The liquid may be UV and/or thermally cured to produce a low refractive index coating.

For instance, as illustrated, liquid precursor drops 904 may be deposited (e.g., at a rate for a corresponding location to achieve a desired antireflective feature) onto the cover layer and the cover layer rotated (e.g., as indicated by arrow 906, at a rotational rate for achieving a desired antireflective feature) to create the antireflective feature 902. An example material for spin coating is Inkron IOC-501, which has a reflective index ranging from 1.25-1.30.

By creating the antireflective feature by coating (e.g., by spin coating), more costly and/or complex antireflective feature creation processes, such as high temperature deposition and/or vacuum deposition, may not be required, reducing eyepiece fabrication cost and/or complexity (e.g., by reducing a costly step).

Figure 10A:
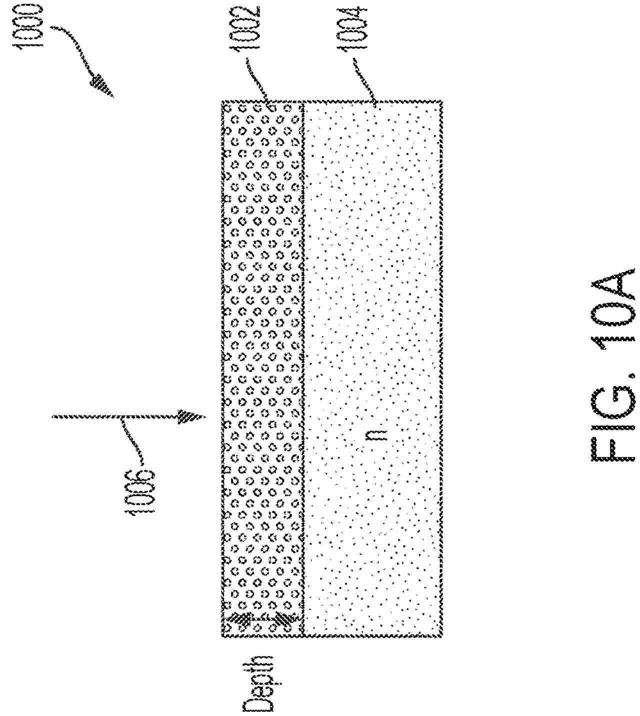
FIGS. 10A-10E illustrates exemplary eyepiece properties, according to embodiments of the disclosure.

FIGS. 10A-10E illustrates exemplary eyepiece properties, according to embodiments of the disclosure. FIG. 10A illustrates exemplary properties of a cover layer 1000. In some embodiments, the cover layer 1000 is a cover layer described herein (e.g., with respect to FIGS. 6-9 and 12). The cover layer 1000 may comprise antireflective feature 1002 having a depth and a material 1004 (e.g., a substrate) having a refractive index n.

FIGS. 10B-10E illustrate reflectivity vs. depth (e.g., of antireflective feature 1002) for different incident light wavelengths 1006 and for different antireflective feature refractive indices. Depending on antireflective requirements and wavelengths of interest, the depth and antireflective feature refractive index are determined accordingly. Antireflective features having the determined depth and refractive index may be fabricated using a method disclosed herein (e.g., described with respect to FIGS. 7-9 and 12).

Figures 10B, 10C, 10D, 10E:
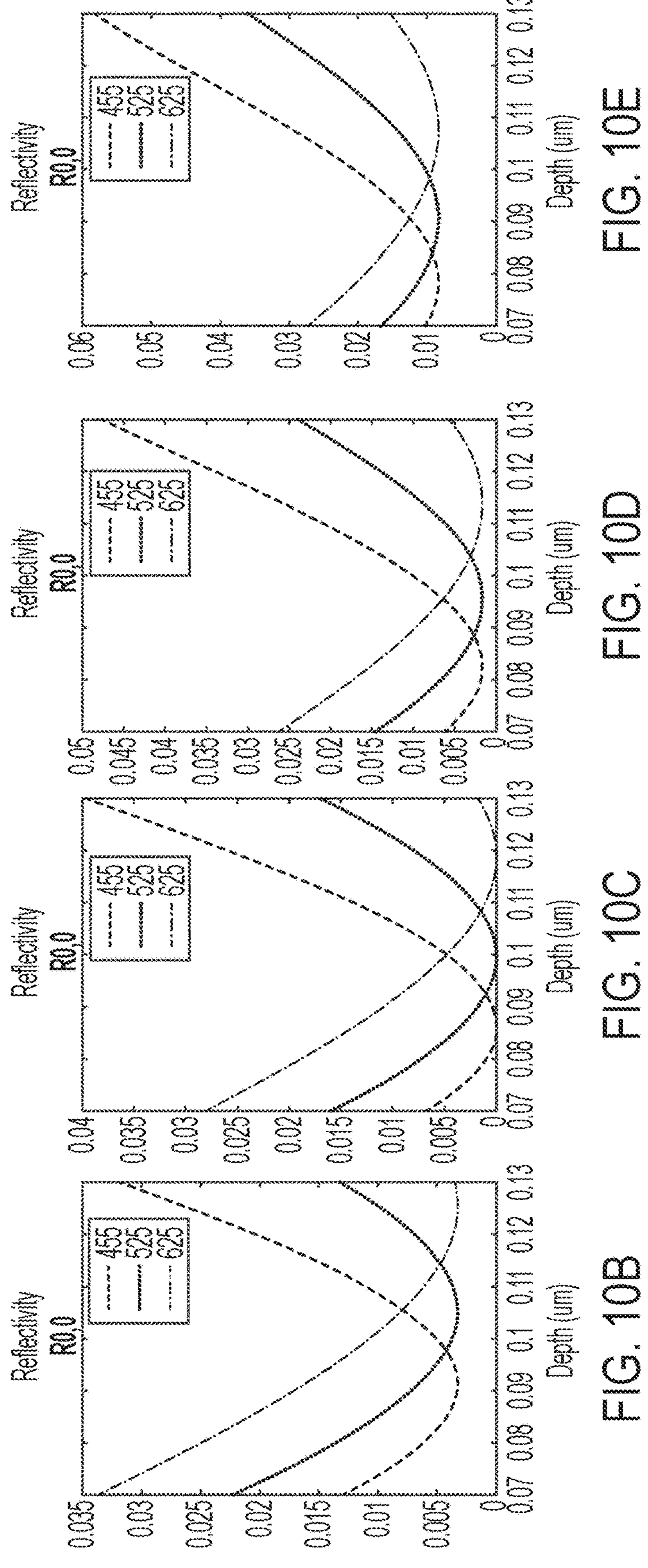

FIG. 10B illustrates reflectivity vs. antireflective feature 1002 depth for blue (e.g., 455 nm), green (e.g., 525 nm), and red (e.g., 625 nm) incident lights 1006 for an example antireflective feature having a refractive index of 1.25. As illustrated, a depth of about 0.09 μm can yield a minimum reflectivity below 0.005 for blue light, a depth of about 0.105 μm can yield a minimum reflectivity below 0.005 for green light, and a depth of about 0.125 μm can yield a minimum reflectivity below 0.005 for red light.

FIG. 10C illustrates reflectivity vs. antireflective feature 1002 depth for blue (e.g., 455 nm), green (e.g., 525 nm), and red (e.g., 625 nm) incident lights 1006 for an example antireflective feature having a refractive index of 1.32. As illustrated, a depth of about 0.085 μm can yield a minimum reflectivity close to 0 for blue light, a depth of about 0.1 μm can yield a minimum reflectivity close to 0 for green light, and a depth of about 0.12 μm can yield a minimum reflectivity close to 0 for red light.

FIG. 10D illustrates reflectivity vs. antireflective feature 1002 depth for blue (e.g., 455 nm), green (e.g., 525 nm), and red (e.g., 625 nm) incident lights 1006 for an example antireflective feature having a refractive index of 1.38. As illustrated, a depth of about 0.08 μm can yield a minimum reflectivity around 0.002 for blue light, a depth of about 0.095 μm can yield a minimum reflectivity around 0.002 for green light, and a depth of about 0.11 μm can yield a minimum reflectivity around 0.002 for red light.

FIG. 10E illustrates reflectivity vs. antireflective feature 1002 depth for blue (e.g., 455 nm), green (e.g., 525 nm), and red (e.g., 625 nm) incident lights 1006 for an example antireflective feature having a refractive index of 1.45. As illustrated, a depth of about 0.08 μm can yield a minimum reflectivity below 0.01 for blue light, a depth of about 0.09 μm can yield a minimum reflectivity below 0.01 for green light, and a depth of about 0.11 μm can yield a minimum reflectivity below 0.01 for red light.

FIG. 11 illustrates an exemplary eyepiece stack, according to embodiments of the disclosure. In some embodiments, as illustrated, the eyepiece stack 1100 (e.g., an eyepiece stack of an MR system, an eyepiece stack of a wearable head device) comprises one or more of antireflective features 1102, 1104, and 1106. In some embodiments, the eyepiece 1100 comprise different antireflective features. For example, a first antireflective feature (e.g., one of 1102, 1104, or 1106) and a second antireflective feature may be different (e.g., another one of eyepieces 1102, 1104, or 1106). For instance, the first antireflective feature may be more antireflective (e.g., have a lower reflectivity) than the second antireflective feature for light at a first wavelength. As another example, the second antireflective feature may be more antireflective (e.g., have a lower reflectivity) than the first antireflective feature for light at a second wavelength. The respective antireflective feature may be determined based on a wavelength of interest corresponding to a particular eyepiece, and the determined antireflective feature may be created using the methods described herein (e.g., as described with respect to FIGS. 7-9 and 12).

Figure 12:
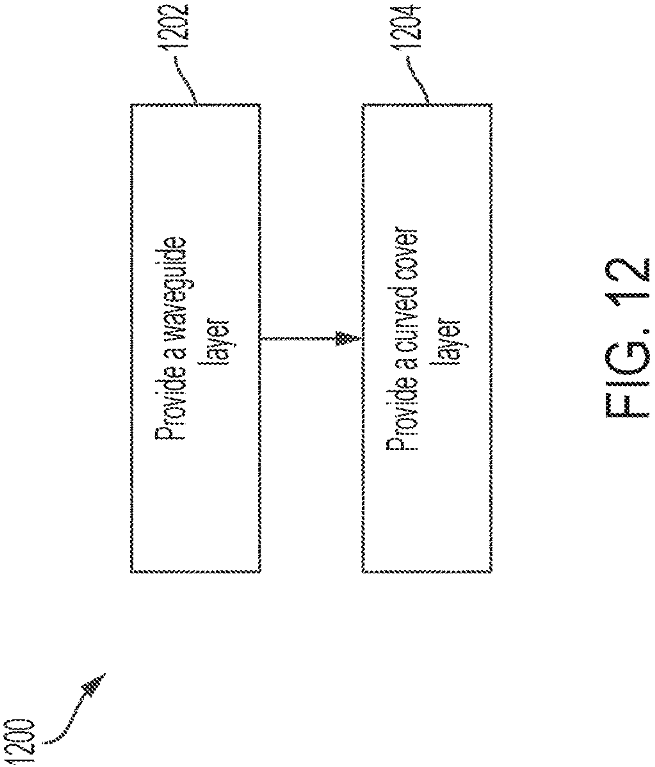
FIG. 12 illustrates an exemplary method of fabricating an eyepiece, according to embodiments of the disclosure.

FIG. 12 illustrates an exemplary method 1200 of fabricating an eyepiece, according to embodiments of the disclosure. Although the method 1200 is illustrated as including the described steps, it is understood that different order of steps, additional steps, or fewer steps may be included without departing from the scope of the disclosure. For example, step 1204 may be performed before or after step 1202, or steps 1202 and 1204 may be performed at a same time. For brevity, some advantages and features described with respect to FIGS. 5-11 are not repeated here.

In some embodiments, the method 1200 includes providing a waveguide layer for propagating light (step 1202). For example, as described with respect to FIGS. 5 and 6A-6C, a waveguide layer (e.g., waveguide layer 504, 604, 606, 608, 624, 626, 628, 644, 646, or 648) is provided. In some embodiments, the waveguide layer is curved. For example, as described with respect to FIGS. 5 and 6A-6C, a waveguide layer (e.g., waveguide layer 504, 604, 606, or 608) is curved.

In some embodiments, the method 1200 includes optically coupling a projector to the waveguide layer. The projector generates the light propagated in the waveguide layer. For example, as described with respect to FIGS. 6A-6C, a projector (e.g., projector 612, 632, or 652) is optically coupled to a waveguide layer (e.g., waveguide layer 604, 606, 608, 624, 626, 628, 644, 646, or 648).

In some embodiments, the method 1200 includes providing a curved cover layer (step 1204). For example, as described with respect to FIGS. 6-9, a curved cover layer (e.g., cover layer 602, 622, 630, 642, 650, 700B, 800, or 900) is provided.

In some embodiments, the method 1200 includes creating an antireflective feature on the curved cover layer. For example, as described with respect to FIGS. 6-10, an antireflective feature (e.g., antireflective feature 702, 802, 902, or 1002) is created on the cover layer. In some embodiments, the antireflective feature is created by casting, using moth-eye film, by spin coating, by dip coating, or by spray coating. For example, as described with respect to FIG. 7, antireflective feature 702 is created by casting. As another example, as described with respect to FIG. 8, antireflective feature 802 is created using moth-eye film. As yet another example, as described with respect to FIG. 9, antireflective feature 902 is created by spin coating, by dip coating, or by spray coating.

In some embodiments, the cover layer is curved toward the waveguide layer. For example, as described with respect to FIG. 6B, the cover layer 630 is curved toward a waveguide layer. In some embodiments, the cover layer is curved away from the waveguide layer. For example, as described with respect to FIGS. 6A-6C, a cover layer (e.g., cover layer 602, 622, 642, or 650) is curved away from a waveguide layer.

In some embodiments, a length of the curved cover layer is shorter than a length of the waveguide layer. For example, as described with respect to FIG. 6C, a length of the cover layer 642 is shorter than a length of the waveguide layer (e.g., truncated). In some embodiments, the method 1200 includes forming a hole in the curved cover layer. For example, as described with respect to FIG. 6C, a hole 654 is formed in the cover layer 650.

In some embodiments, the method 1200 includes providing a second cover layer. For example, as described with respect to FIGS. 6-9, a second cover layer (e.g., cover layer 610, 620, 630, 640, 650, 700A, 700B, 800, or 900) is provided. In some embodiments, the second cover layer is curved. For example, as described with respect to FIGS. 6-9, a second cover layer (e.g., cover layer 602, 622, 630, 642, 650, 700B, 800, or 900) is curved.

According to some embodiments, the eyepiece comprises a curved cover layer and a waveguide layer for propagating light.

According to some embodiments, the waveguide layer is curved.

According to some embodiments, the eyepiece further comprises a second cover layer.

According to some embodiments, the second cover layer is curved.

According to some embodiments, the curved cover layer comprises an antireflective feature.

According to some embodiments, the curved cover layer comprises a second antireflective feature.

According to some embodiments, the antireflective feature is created by casting, using moth-eye film, by spin coating, by dip coating, or by spray coating.

According to some embodiments, the cover layer is curved toward the waveguide layer.

According to some embodiments, the cover layer is curved away from the waveguide layer.

According to some embodiments, the light propagated in the waveguide layer is generated from a projector.

According to some embodiments, a length of the curved cover layer is shorter than a length of the waveguide layer.

According to some embodiments, the curved cover layer comprises a hole.

According to some embodiments, a method for fabricating an eyepiece comprises: providing a waveguide layer for propagating light; and providing a curved cover layer.

According to some embodiments, the waveguide layer is curved.

According to some embodiments, the method further comprises providing a second cover layer.

According to some embodiments, the second cover layer is curved.

According to some embodiments, the method further comprises creating an antireflective feature on the curved cover layer.

According to some embodiments, the antireflective feature is created by casting, using moth-eye film, by spin coating, by dip coating, or by spray coating.

According to some embodiments, the cover layer is curved toward the waveguide layer.

According to some embodiments, the cover layer is curved away from the waveguide layer.

According to some embodiments, the method further comprises optically coupling a projector to the waveguide layer, wherein the projector generates the light propagated in the waveguide layer.

According to some embodiments, a length of the curved cover layer is shorter than a length of the waveguide layer.

According to some embodiments, the method further comprises forming a hole in the curved cover layer.

According to some embodiments, a wearable head device comprises: a first eyepiece of any of the above eyepieces; and a second eyepiece of any of the above eyepieces.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A display system, comprising:

a curved cover layer comprising an antireflective feature;

a second cover layer;

a waveguide layer between the curved cover layer and the second cover layer, wherein the waveguide layer is configured to propagate light therein;

a projector configured to output the light for propagation in the waveguide layer; and an opening in the curved cover layer or second cover layer, the opening aligned with the projector and configured to optically couple the projector to the waveguide layer.

2. The display system of claim 1, wherein the waveguide layer is curved.

3. The display system of claim 1, wherein the second cover layer is curved.

4. The display system of claim 1, wherein the curved cover layer comprises a second antireflective feature.

5. The display system of claim 1, wherein the antireflective feature is created by one or more of casting, using moth-eye film, spin coating, dip coating, and spray coating.

6. The display system of claim 1, wherein the curved cover layer is curved in a direction toward the waveguide layer.

7. The display system of claim 1, wherein the curved cover layer is curved in a direction away from the waveguide layer.

8. The display system of claim 1, wherein a length of the curved cover layer is shorter than a length of the waveguide layer.

9. The display system of claim 1, wherein the curved cover layer comprises the opening.

10. The display system of claim 1, wherein the projector is disposed at the opening.

11. A method of fabricating an eyepiece, the method comprising:

providing a waveguide layer having first and second opposing major surfaces, the waveguide layer configured to propagate light received from a projector;

providing a curved cover layer facing the first opposing major surface, the curved cover layer comprising an antireflective feature;

providing a second cover layer facing the second opposing major surface; and providing an opening in the curved cover layer or second cover layer, the opening aligned with the projector and configured to optically couple the waveguide layer to the projector.

12. The method of claim 11, wherein the waveguide layer is curved.

13. The method of claim 11, wherein the second cover layer is curved.

14. The method of claim 11, wherein the antireflective feature is created by one or more of casting, using moth-eye film, spin coating, dip coating, and spray coating.

15. The method of claim 11, wherein the curved cover layer is curved in a direction toward the waveguide layer.

16. The method of claim 11, wherein the curved cover layer is curved in a direction away from the waveguide layer.

17. The method of claim 11, wherein a length of the curved cover layer is shorter than a length of the waveguide layer.

18. The method of claim 11, wherein providing the opening comprises forming a hole in the curved cover layer.

19. A wearable head device, comprising:

a first eyepiece; and a projector optically coupled to the first eyepiece, wherein the first eyepiece comprises:

a curved cover layer, the curved cover layer comprising an antireflective feature;

a second cover layer;

a waveguide layer between the curved cover layer and the second cover layer, wherein the waveguide layer is configured to propagate light generated by the projector; and an opening in the curved cover layer or second cover layer, the opening aligned with the projector and configured to optically couple the projector to the waveguide layer.

20. The wearable head device of claim 19, wherein the projector is disposed at the opening.

* * * * *